(12) United States Patent
Kim

(10) Patent No.: US 6,308,114 B1
(45) Date of Patent: Oct. 23, 2001

(54) ROBOT APPARATUS FOR DETECTING DIRECTION OF SOUND SOURCE TO MOVE TO SOUND SOURCE AND METHOD FOR OPERATING THE SAME

(76) Inventor: In-Kwang Kim, #301 Gusam Villa, 223-10 Sangdo 4-Dong, Dongjak-Ku, Seoul 156-034 (KR)

( * ) Notice: Subject to any disclaimer, the term of this patent is extended or adjusted under 35 U.S.C. 154(b) by 0 days.

(21) Appl. No.: 09/719,866

(22) PCT Filed: Apr. 20, 2000

(86) PCT No.: PCT/KR00/00372

§ 371 Date: Dec. 19, 2000

§ 102(e) Date: Dec. 19, 2000

(87) PCT Pub. No.: WO00/63721

PCT Pub. Date: Oct. 26, 2000

(30) Foreign Application Priority Data

Apr. 20, 1999 (KR) ................................. 199-14029

(51) Int. Cl.[7] .................................................. G06F 19/00
(52) U.S. Cl. .................... 700/245; 700/2; 700/9; 700/159; 700/169; 700/174; 700/195; 340/679; 340/680; 340/683; 340/686.5; 720/150; 720/182; 446/175
(58) Field of Search ....................... 700/245, 159, 700/174, 2, 9, 195; 340/679, 680, 683, 686.5; 702/185, 182, 150; 73/623; 704/260; 446/175; 318/507; 701/23

(56) References Cited

U.S. PATENT DOCUMENTS 4,245,430 * 1/1981 Hoyt ...................................... 446/175
4,692,941 * 9/1987 Jacks et al. ........................... 704/260
4,827,395 * 5/1989 Anders et al. ............................. 700/9
5,089,824 * 2/1992 Uematsu et al. ...................... 342/359
5,566,092 * 10/1996 Wang et al. .......................... 702/185
5,602,533 * 2/1997 Boverio .............................. 340/686.5
5,878,327 * 3/1999 Hayashi et al. ......................... 455/41

FOREIGN PATENT DOCUMENTS 62133895   6/1987 (JP) .
08082664   3/1996 (JP) .
91-2926    5/1991 (KR) .

OTHER PUBLICATIONS

Kobyashi et al., New ensemble system based on mutual entrainment, 2000, IEEE, pp. 288–291.*
Tse, et al., Design of a Navigation System for a Household Mobile Robot Using Neural Networks Proceedings, 1998, pp. 2152–2154.
Kurata et al., "Multmedia Sensing System for Robot," Robot and Human Communication, 1995, pp. 84–86.
Kanigisawa, et al., An Operator Interface for Autonomous Mobile Robot Using Whistle Sound and Source Direction Detection System, Industrial Electronic, Control, and Instrumentation, 1995, vol. 2 pp. 1118–1123.

* cited by examiner

Primary Examiner—William A. Cuchlinski, Jr.
Assistant Examiner—McDieunel Marc
(74) Attorney, Agent, or Firm—Greenblum & Bernstein, P.L.C.

(57) ABSTRACT

A robot apparatus for detecting a sound signal outputted from a sound signal generating unit to move to a position of the sound signal generating device, wherein the sound signal has a specific pattern, includes: at least three sound receiving unit (114) for receiving the sound signal; a phase difference detecting unit (118) for detecting a phase difference between each sound signal from the sound receiving unit (114); a processing unit (125) for determining a position of the sound generating unit using the phase difference, to generate a moving control signal; and a moving unit (130) for moving the robot apparatus in response to the moving control signal.

69 Claims, 28 Drawing Sheets

FIG. 12
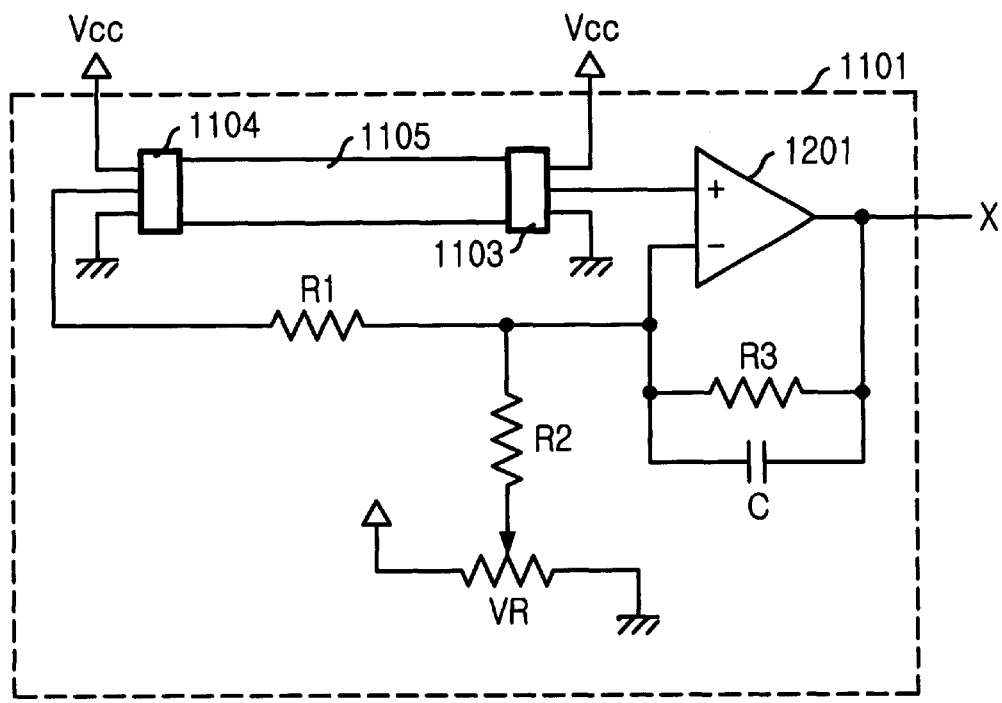
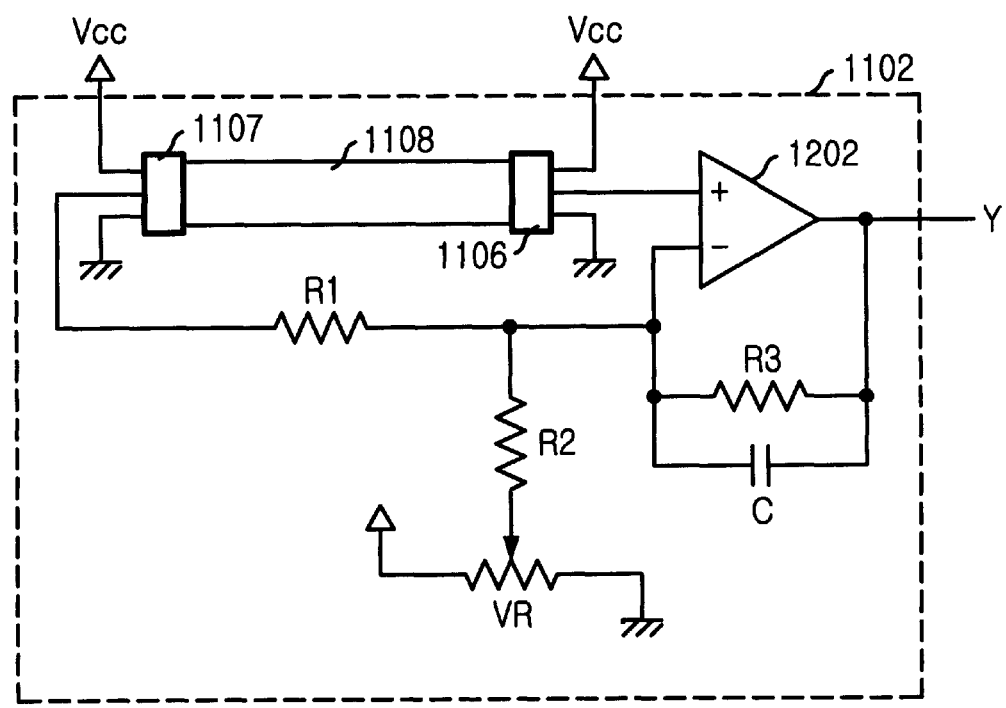

FIG. 23
(A)
(B)
(C)
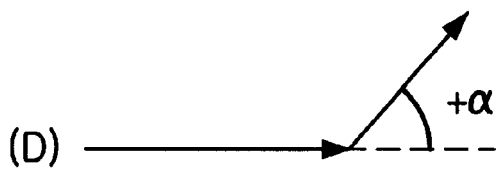
(D)
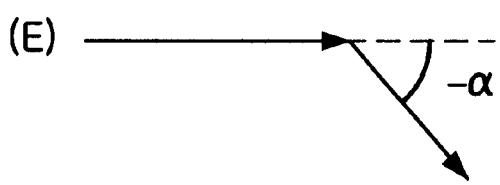
(E)
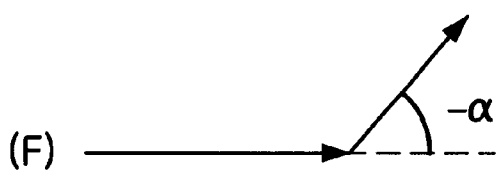
(F)
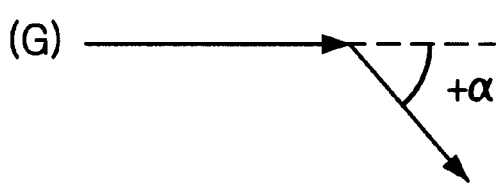
(G)

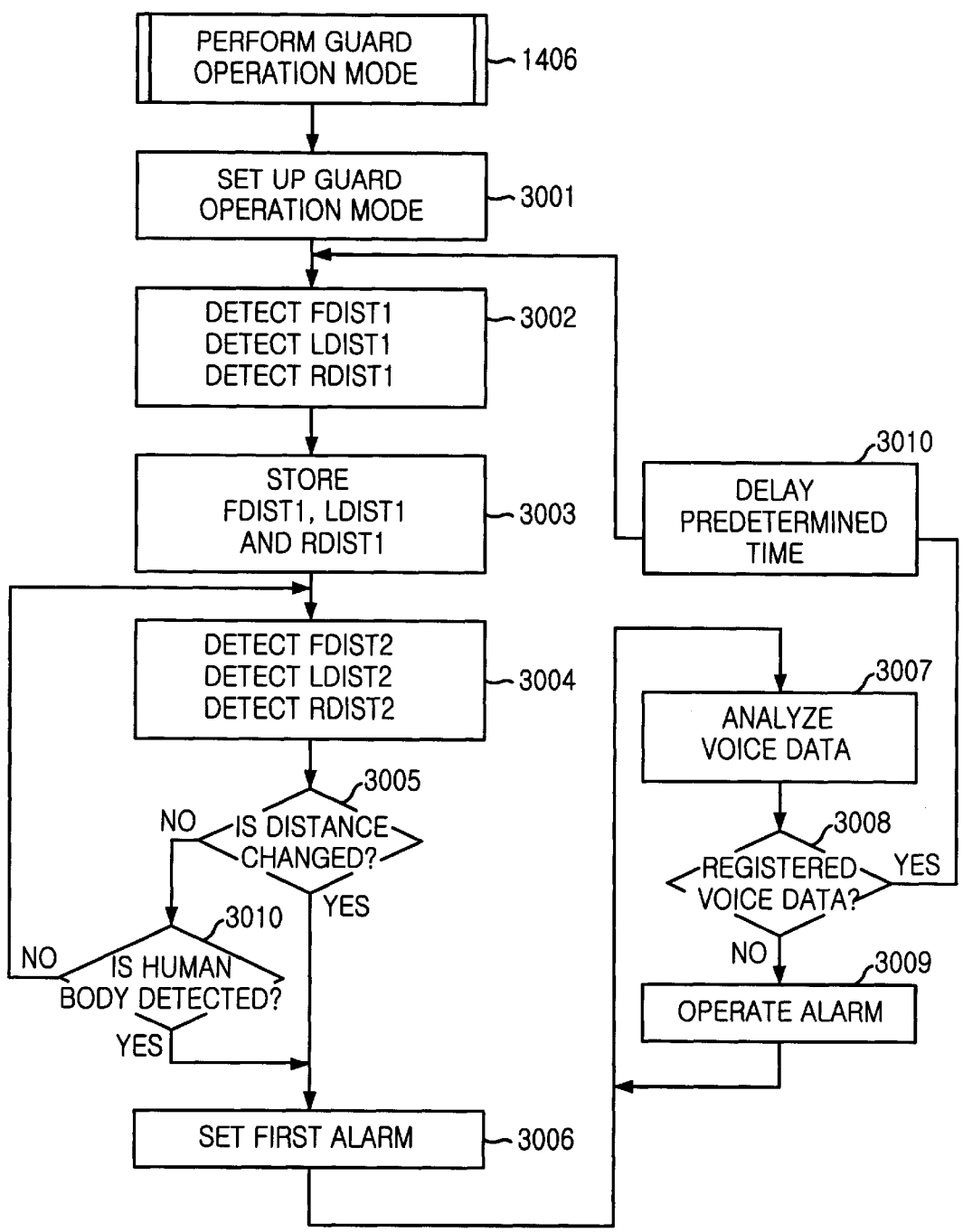

ROBOT APPARATUS FOR DETECTING DIRECTION OF SOUND SOURCE TO MOVE TO SOUND SOURCE AND METHOD FOR OPERATING THE SAME

DESCRIPTION

1. Technical Field

The present invention relates to a robot apparatus for detecting a direction of sound source to move thereto; and, more particularly, to a robot apparatus for receiving a sound signal having a specific pattern, outputted from a sound source, and detecting a current direction of the robot apparatus and a correct direction of the sound source by using a phase difference between the sound signals, to thereby move thereto, and a method for operating the same.

2. Background Art

Generally, a movable robot is widely used in various fields such as industrial robot and a toy. Such a movable robot has several detectors and a moving means, wherein the detectors include a distance measurement instrument, a sensor for sensing a human body, and the like. The robot detects a target spot or a current position and then moves to the target spot by using detected target spot or detected current place.

As one of the detectors, an apparatus for detecting a direction of sound source is disclosed in Korea Patent No. 91-2926. Instead of detecting a correct place of the sound source, however, the apparatus detects a direction of the sound source in a six direction by using a sequence of sound signals received through receivers that are mounted to the robot. Therefore, the detection of the sound source may be incorrect and an error may also occur due to surrounding sounds, so that the conventional robot is applicable only to a toy. There are limitations to apply to a robot requiring a sophisticated detection. That is, it is difficult to implement a robot having an auto charging function for docking to the charger by detecting a place of the charger to move to the charger.

DISCLOSURE OF INVENTION

In accordance with an aspect of the present invention, there is provided a robot apparatus for detecting a sound signal outputted from a sound signal generating means to move to a position of the sound signal generating mean, wherein the sound signal has a specific pattern, the robot apparatus comprising: at least three sound receiving means for receiving the sound signal outputted from the sound signal generating means; a phase difference detection means for detecting a phase difference between each sound signals from the sound receiving means; a processing means for determining a position of the sound generating means using the phase difference, to generate a moving control signal; and a moving means, in response to the moving control signal, for moving the robot apparatus to the position of the sound generating means.

In accordance with another aspect of the present invention, there is provided a method for operating a robot apparatus for detecting a sound signal outputted from a sound signal generating means to move to a position of the sound signal generating mean, wherein the sound signal has a specific pattern, the method comprising the steps of: a) determining whether an operation mode is set up; b) if the operation mode is not set up, setting up a standby mode to sense and tracing a human body existing within a predetermined distance; c) if the operation models set up, determining a kind of operation mode; and d) according to the operation mode, clearing a predetermined area by using an information of a plane structure obtained by searching and analyzing the plane structure, docking to a battery by searching the battery generating a sound signal when the battery is discharged, searching a sound source for generating a sound signal and performing a guard operation.

BRIEF DESCRIPTION OF THE DRAWINGS

The above and other objects and features of the instant invention will become apparent from the following description of preferred embodiments taken in conjunction with the accompanying drawings, in which:

FIG. 12 is a circuit diagram illustrating an electronic compass shown in FIG. 11;

FIG. 23 is a diagram explaining an analysis of a plane structure in FIG. 22;

FIG. 30 is a flow chart illustrating sequential steps of performing a guard operation.

BEST MODE FOR CARRYING OUT THE INVENTION

Figure 1:
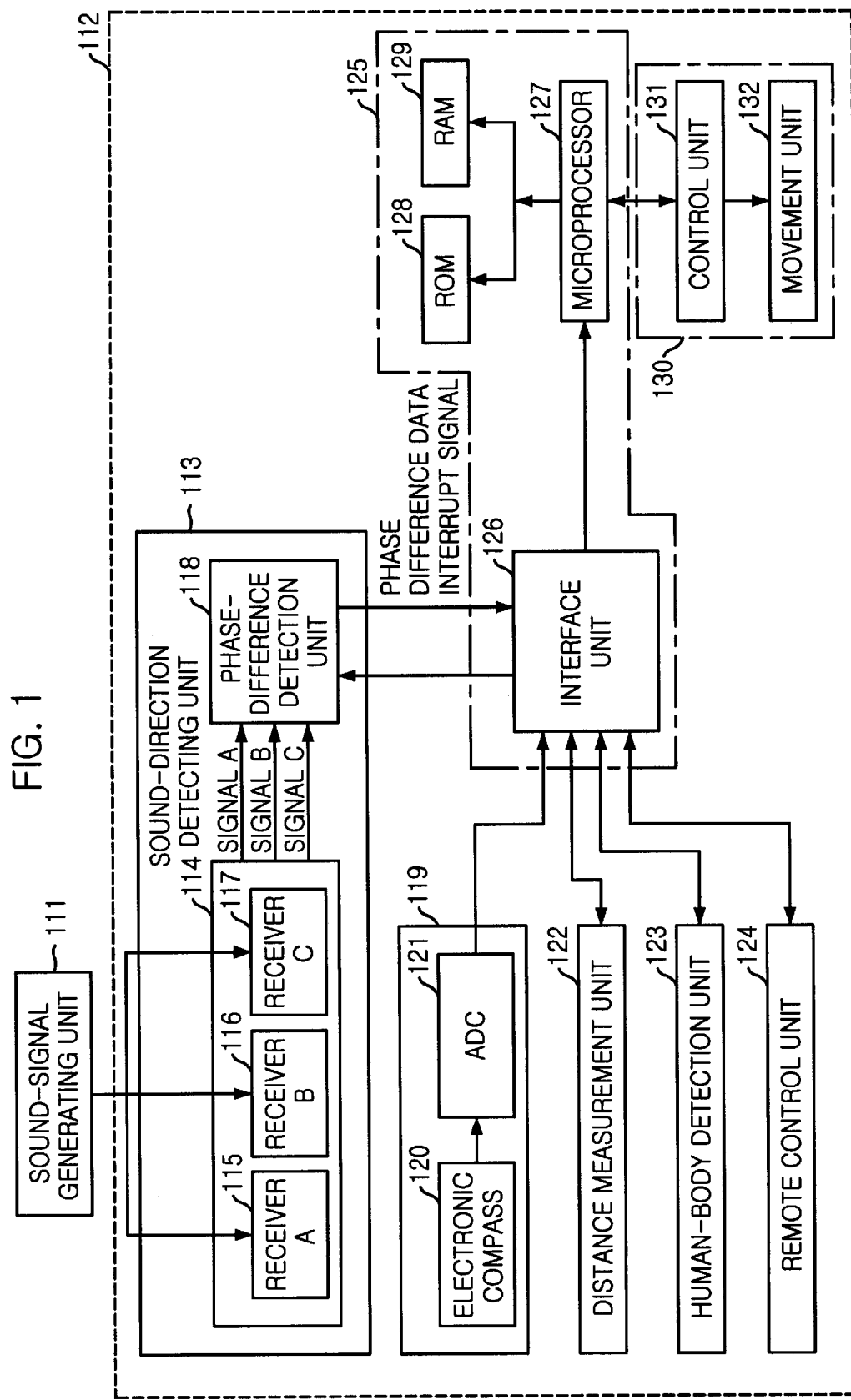
FIG. 1 is a block diagram illustrating a robot apparatus for detecting a direction of sound source and moving to a place of the sound source in accordance with the present invention.

FIG. 1 is a block diagram illustrating a robot for detecting a direction of sound source and moving to a place of the sound source in accordance with the present invention.

Referring to FIG. 1, the present invention includes a sound-signal generating unit 111 for generating sound signals having a specific pattern for a predetermined time, and a robot 112 for receiving the sound signals outputted from the sound-signal generating unit 111 and detecting a direction of the sound source by using a phase difference between received sound signals, to move to a place of the sound source.

The robot 112 also includes a sound-direction detection unit 113, a movement-direction detection unit 119 having an electronic compass 120 and an analog-to-digital converter, a data processing unit 125 for processing detected data, and a movement control unit 130 for controlling a movement of the robot. The data processing unit 125 includes an interface unit 126 for transferring the detected data, a micro-processor 127 for managing a process of the detected data, and a ROM 128 and a RAM 129 for storing processed data. The movement control unit 130 includes a control unit 131 for generating a movement control signal for controlling a movement of the robot under a control of the microprocessor 127, and a movement unit 132 for moving the robot to a specific place by using motors which are responsive to the movement control signal.

The robot 112 further includes a distance measurement unit 122 having an ultrasonic telemeter, mounted on a front, a left, and a right sides thereof, for measuring distances between the robot and walls, a human body detection unit 123 having a sensor for detecting a human body, a remote control unit 124 having a remote controller for remote controlling the movement of the robot. At this time, the ultrasonic telemeter, the sensor, and the remote controller can be implemented with commercial products.

The sound-direction detection unit 113 includes a sound signal receiving unit 114 having a plurality of receivers for receiving sound signal outputted from the sound signal generating unit 111, and a phase difference detection unit 118 for detecting a phase difference between signals outputted from the sound signal receiving unit 114. At this time, more than three receivers can be used, and FIG. 2 shows a sound signal receiving unit using three receivers 115, 116 and 117, and FIG. 3 shows a sound signal receiving unit using six receivers.

Figure 2:
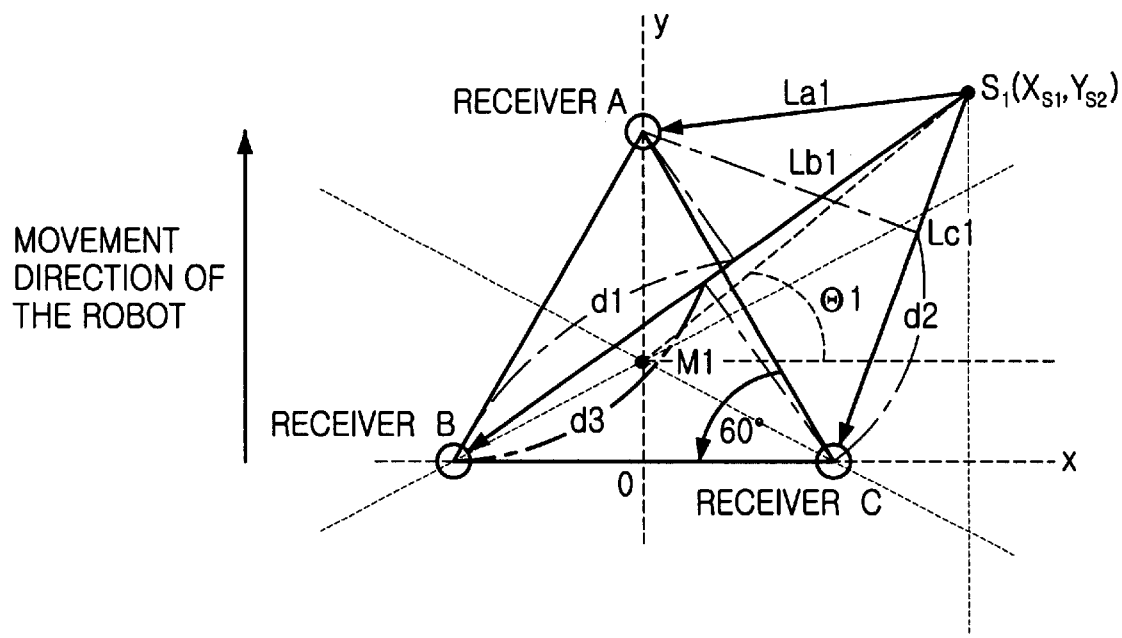
FIG. 2 is a diagram illustrating a receiving unit having three receivers in FIG. 1.

In FIG. 2, there is shown distances and angles between the receivers and the sound source, wherein the receivers are mounted on the upper or bottom surface of the robot in an equilateral triangle form. Here, a reference symbol $S(X_{s1}, Y_{s1})$ represents a position of the sound source, M a central point of the equilateral triangle, and $\Theta$ an angle between the central point M and the place of the sound source $S(X_{s1}, Y_{s1})$, respectively. A reference symbol $L_{a1}$, $L_{b1}$, and $L_{c1}$ represent distances between the place $S(X_{s1}, Y_{s1})$ of the sound source and the receiver A, the receiver B, and the receiver C, respectively. Here, distance differences between the sound source and respective receivers corresponds to phase differences between sound signals received by respective receivers, and it will be described in detail with reference to FIG. 4.

Figure 3:
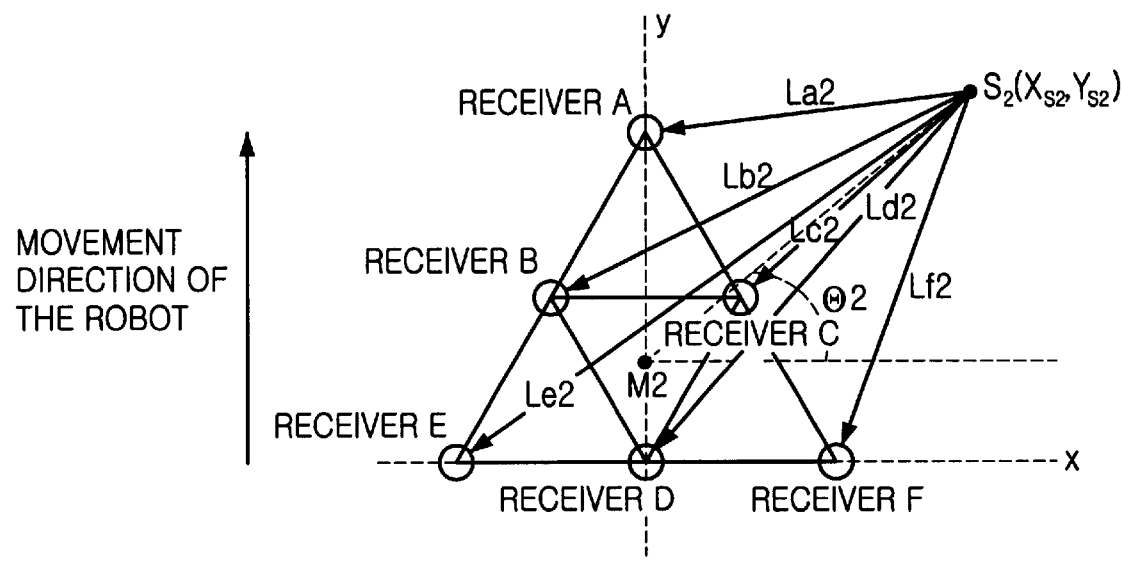
FIG. 3 is a diagram illustrating a receiving unit having six receivers in FIG. 1.

Referring to FIG. 3, when using four receivers, the receivers A, B ,C and D are used, and when using five receivers, the receivers A, B, C, D and E are used, and when using six receivers, the receivers A, B, C, D, E and F are used. That is, based on an equilateral triangle, as receivers are increased one by one, the receivers are arranged in an equilateral triangle form.

Figure 4:
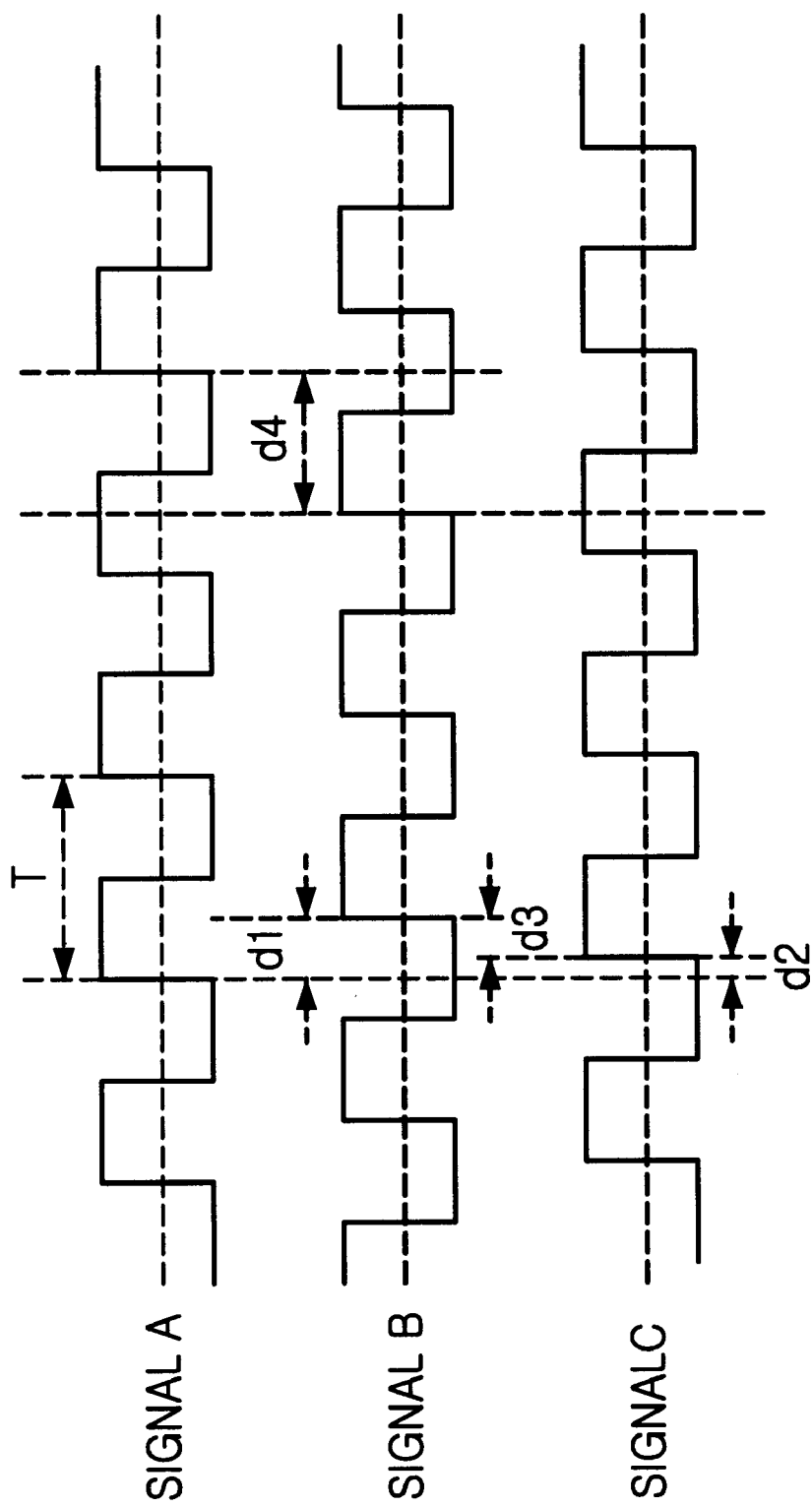
FIG. 4 is a timing chart illustrating pattern of sound signal received through a receiving unit.

FIG. 4 is a timing chart illustrating patterns of the sound signals received through the receivers A, B, and C in case where the sound signals are received in a sequence of the receiver A, the receiver B, and the receiver C in this order. Here, a reference symbol T represents a period of signals outputted from the receivers, d1 a difference between a distance from the sound source to the receiver A and a distance from the sound source to the receiver B, wherein the d1 corresponds to a phase difference between a signal A outputted from the receiver A and a signal B outputted from the receiver B, d2 a difference between a distance from the sound source to the receiver A and a distance between the sound source to the receiver C, wherein the d2 corresponds to a phase difference between the signal A to a signal C outputted from the receiver C, and d3 a difference between a distance from the sound source to the receiver B and a distance from the sound source to the receiver C, wherein the d3 corresponds to a phase difference between the signal C and the signal B outputted from the receiver B, respectively.

As one embodiment of the present invention, the sound signal outputted from the sound signal generating unit 111 can be used with a signal having an audio frequency of 2.76 kHz.

Referring to FIGS. 2 and 4, respective receivers are arranged to make maximum phase difference of sound signals received through the receivers to be within a half the frequency of the sound signal outputted from the sound signal generating unit 111. Additionally, based on a rising edge of the signal A, the signal A is received earlier than the signal B by the d1, the signal C is received earlier than the signal B by the d3, and the signal A is received earlier than the signal C by d2. On the contrary, based on a rising edge of the signal B, it is determined that the signal B is received later than the signal A by (T-d4) because a phase difference between the rising edge of the signal A and the rising edge of the signal B is greater than T/2. At this time, when a maximum phase difference between the signal A and the signal B is near T/2, an error may occur. Therefore, it is desirable that the receivers are arranged to have a maximum phase difference between each two signals in a range of 0.3T to 0.4T.

In an embodiment of the present invention, the maximum phase difference is set to 0.375T and the phase difference is divided into 32 sections. Furthermore, angles corresponding to phase differences of respective signals are previously calculated and stored in the ROM 128 in a table form. Accordingly, the sound direction is detected within 32 sections by using approximate values of the angles corresponding to the phase differences. At this time, the angles of the sound direction corresponding to the phase differences between respective signals are calculated by using the distances between the sound source and the respective receivers, the distance differences between the sound source and the respective receivers and the angles between the sound source and the central point of the equilateral triangle. The above-mentioned calculation method is the same as the method for finding a seismic center in three seismological observatories. For the sake of the convenience in explanation, detailed equations for calculation will be omitted. That is also applicable in case of four receivers.

Figure 5:
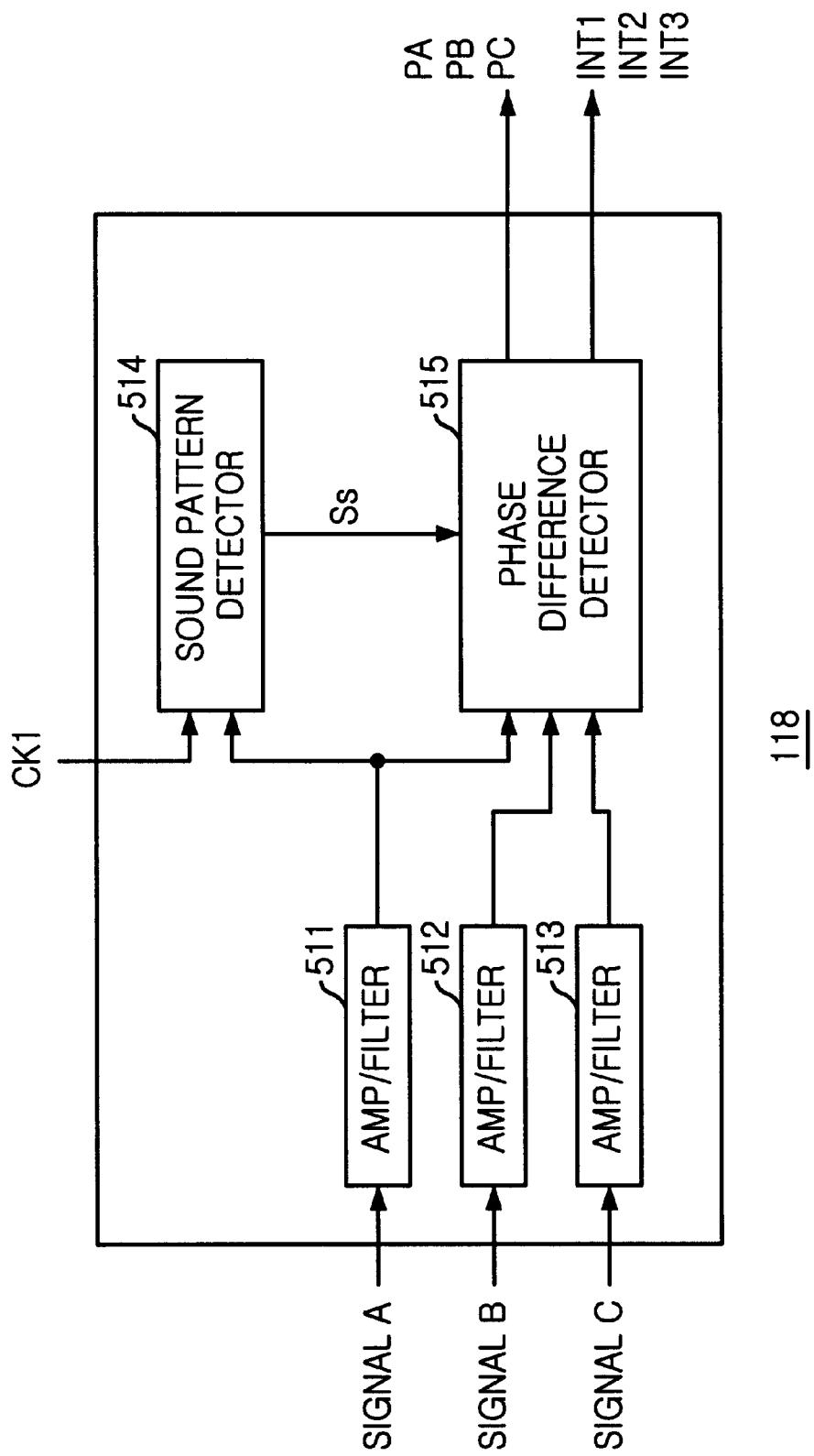
FIG. 5 is a block diagram illustrating a phase-difference detection unit shown in FIG. 1.

FIG. 5 is a block diagram illustrating a phase-difference detection unit 118 contained in the sound-direction detection unit 113 shown in FIG. 1 in case where three receivers 115, 116 and 117 receive the sound signal having the audio frequency.

Referring to FIG. 5, the phase-difference detection unit 118 includes a first, a second, and a third amplifier/filters 511, 512 and 513, a sound-pattern detector 514 and a phase difference detector 515. The first, the second, and the third amplifier/filters 511, 512 and 513 amplify the signal A, the signal B, and the signal C, which are respectively outputted from three receivers 115, 116, and 117, and then perform a band pass filtering to output noiseless rectangular wave signals. The sound-pattern detector 514 receives the rectangular wave signals from the first amplifier/filter 511 and an external clock CK1 and determines whether or not a period of the rectangular wave corresponds to a predetermined period. If it is determined that sound signal having a predetermined sound pattern is continuously received as many as a predetermined number, the sound-pattern detector 514 generates a detection signal $S_s$. Also, the phase difference detector 515 receives outputs signals from the first, the second, the third amplifier/filters 511, 512 and 513 and detects phase differences between respective signals to output phase differences PDA, PDB and PDC in response to the detection signal $S_s$. Additionally, the phase difference detector 515 generates interrupt signals INT1, INT2, and INT3 as a control signal in response to the detection signal $S_s$. The interrupt signals INT1, INT2 and INT3 is transferred to the microprocessor 127 through the interface unit 126, and the microprocessor 127 analyzes the detected phase difference in response to the interrupt signals.

Figure 6:
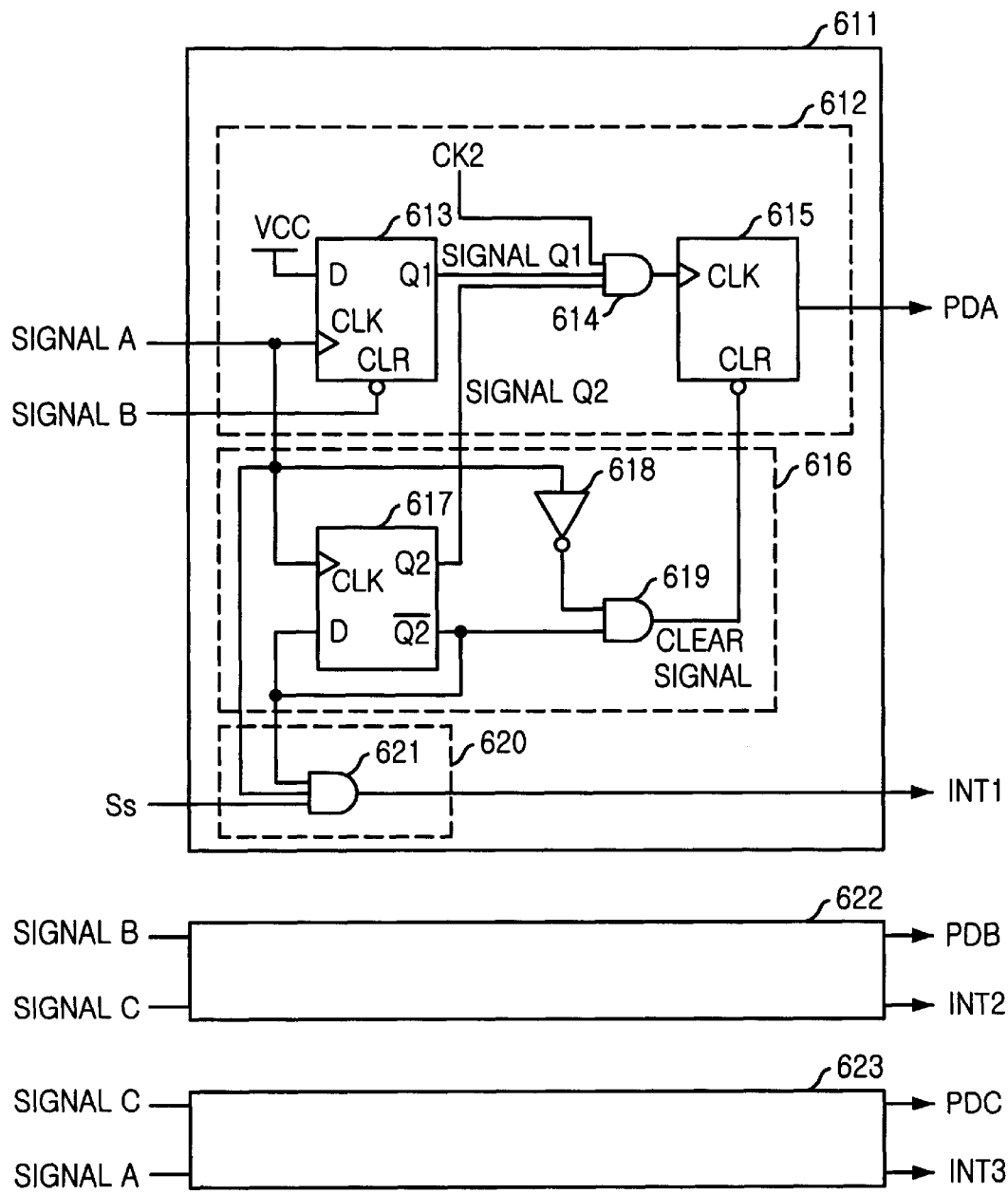
FIG. 6 is a circuit diagram illustrating a phase-difference detection unit shown in FIG. 5.

FIG. 6 is a circuit diagram illustrating a phase difference detector 515 as an embodiment of the present invention. A first detector 611 detects a phase difference between the signal A and the signal B to output a first phase difference data PDA and also receives the detection signal $S_s$ to output a first interrupt signal INT1. A second detector 622 detects a phase difference between the signal B and the signal C to output a second phase difference data PDB and also receives the detection signal $S_s$ to output a second interrupt signal INT2. A third detector 623 detects a phase difference between the signal C and the signal A to output a third phase difference data PDC and also receives the detection signal $S_s$ to output a third interrupt signal INT3. The second and the third detectors 622 and 623 have the same circuit structure as the first detector 611.

Here, since the structure and operation of the second and the third detectors are the same as the first detector, for the sake of convenience in explanation, only the structure and operation of the first detector 611 will be described.

In the first detector 611, a clock counting unit 619 receives the signal A and the signal B and counts the number of clocks CK2 from a rising edge of the signal A to a rising edge of the signal B, to output a first phase difference data PDA. A clear signal generating unit 616 receives the signal A to generate a clear signal for clearing the clock counting unit 612. An interrupt signal generating unit 620 generates a first interrupt signal INT1 for indicating a read timing of the first phase difference data PDA in response to the detection signal $S_s$.

The clock counting unit 612 includes a first D flip flop 613 having an input terminal D, a clock terminal CLK and a clear terminal CLR receiving a power supply voltage level, the signal A and the signal B, respectively, a first AND gate having a first input terminal receiving the clock CK2 and a second input terminal coupled to an output terminal Q1 of the first D flip flop, and a first counter 615 having a clock terminal CLK coupled to an output terminal of the first AND gate 614 and a clear terminal CLR coupled to an output terminal of the clear signal generating unit 616, wherein the first counter outputs the first phase difference data PDA.

The clear signal generating unit 616 includes a second D flip flop having a clock terminal CLK receiving the signal A, an output terminal Q2 coupled to a third input terminal of the first AND gate 614, and an input terminal D coupled to an inverting output terminal Q2, an inverter 618 for inverting the signal A, and a second AND gate 619 for ANDing an output signal of the inverter 618 and an output signal outputted from the inverting output terminal Q2 of the second D flip flop 617, wherein an output terminal of the second AND gate 619 is coupled to the clear terminal CLR of the first counter 615.

The interrupt signal generating unit 620 includes a third AND gate 612 having a first input terminal coupled to the inverting output terminal Q2 of the second D flip flop 617, a second input terminal receiving the signal A and a third input terminal receiving the detection signal $S_s$. The third AND gate 612 performs an AND logic operation to output the first interrupt signal INT1.

The second and the third detectors 622 and 623 operate in the same manner as the first detector 611. The second detector 622 outputs the second phase difference data PDB between the signal B and the signal C and the second interrupt signal INT2. The third detector 623 outputs the third phase difference data PDC between the signal C and the signal A and the third interrupt signal INT3.

Figure 7:
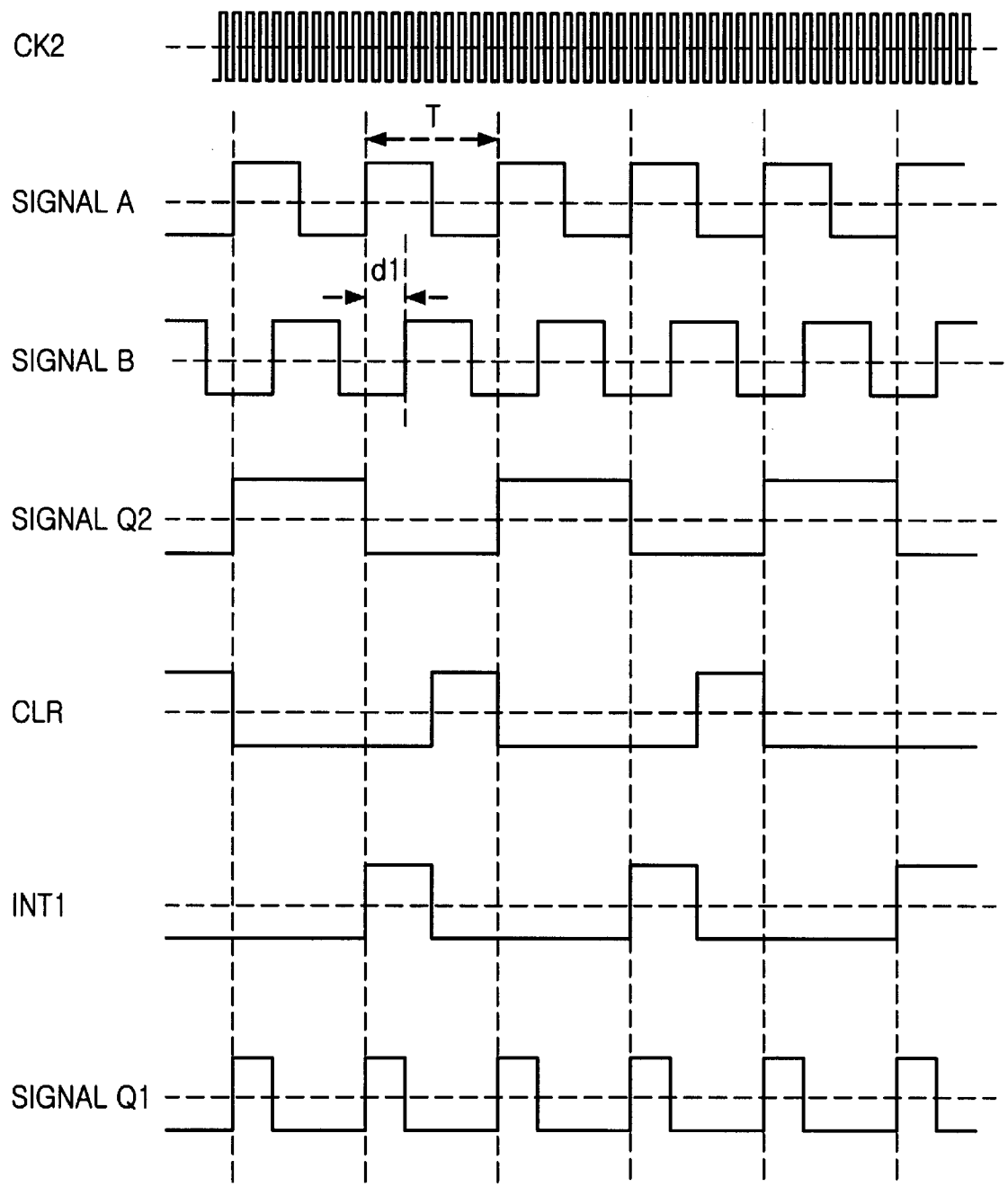
FIG. 7 shows a timing chart of signals in a phase-difference detection unit shown in FIG. 5.

FIG. 7 shows a timing chart of the phase difference detector 611.

Referring to FIGS. 6 and 7, a signal Q2 outputted from the output terminal Q2 of the second D flip flop has twice the frequency of the signal A, and a phase difference between the signal A and the signal B is detected during a high level of the signal Q2. The first interrupt signal INT1, which allows the microprocessor 127 to detect the count value corresponding to the phase difference, is generated during a low level of the signal Q2. That is, when the interrupt signal INT1 outputted from the third AND gate 621 contained in the interrupt signal generating unit 620 is maintained at the high level, the microprocessor 127 detects the count value outputted from the first counter 615 contained in the clock counting unit 612.

The first counter 615 is cleared at the rising edge of the clear signal outputted from the second AND gate 619, and then a next phase difference is detected and a count operation is performed at a rising edge of a next signal Q2.

Here, since an output signal of the first AND gate 614 becomes a low level in case where the signal Q2 is a low level, a count operation of the first counter 615 is not performed.

The signal Q1 outputted from the output terminal Q1 of the first D flip flop 613 becomes a high level from the rising edge of the signal A to the rising edge of the signal B, and during that period, the first counter 615 counts the number of the clocks CK2, and then outputs the first phase difference data.

The count value from the first counter 615 is transferred to the microprocessor 127 at the rising edge of the interrupt signal INT1. That is, until the clear signal becomes a high level to clear the first counter 615, the microprocessor 127 reads the first phase difference data outputted from the first counter 615.

In the same manner, the phase difference between the signal B and the signal C and the phase difference between the signal C and the signal A can be detected. Meanwhile, in case where the maximum phase difference is 2.76 kHz, the clock CK2 can divide a period corresponding to 0.375T of the sound source into 32 sections. Therefore, as an embodiment of the present invention, a rectangular wave having a frequency of 235.52 kHz is used.

Figure 8:
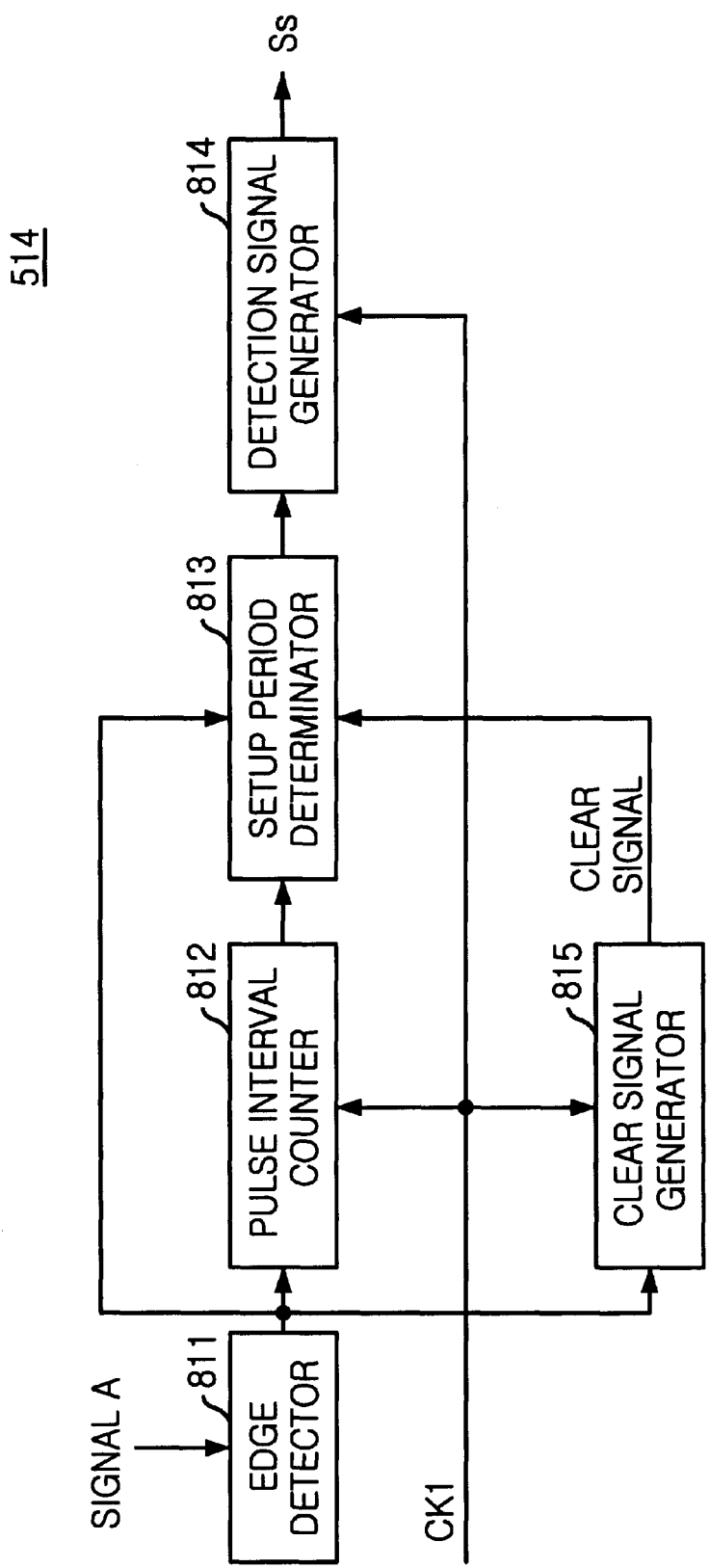
FIG. 8 is a block diagram illustrating a sound pattern detector shown in FIG. 5.

FIG. 8 is a block diagram illustrating a sound-pattern detector shown in FIG. 5.

Referring to FIG. 8, the sound-pattern detector 514 includes an edge detector 811 for detecting rising and falling edges to generate pulses, a pulse interval counter 812 for counting the number of clocks CK1 between pulse intervals outputted from the edge detector 811 to output a count value, a setup period determinator 813, in response to the pulse outputted from the edge detector 811, for receiving the count value from the pulse interval detector 812 and detecting whether or not the signal A has a predetermined period, a detection signal generator 814 for checking whether the signal A having the predetermined period is continuously inputted and for generating the detection signal $S_s$, and a clear signal generator 815, in response to the clock CK1, for receiving the pulses outputted from the edge detector 811 and checking whether the signal A is inputted at a setup period for a predetermined time, to generate a clear signal for clearing the detection signal $S_s$ outputted from the detection signal generator 814.

Figure 9:
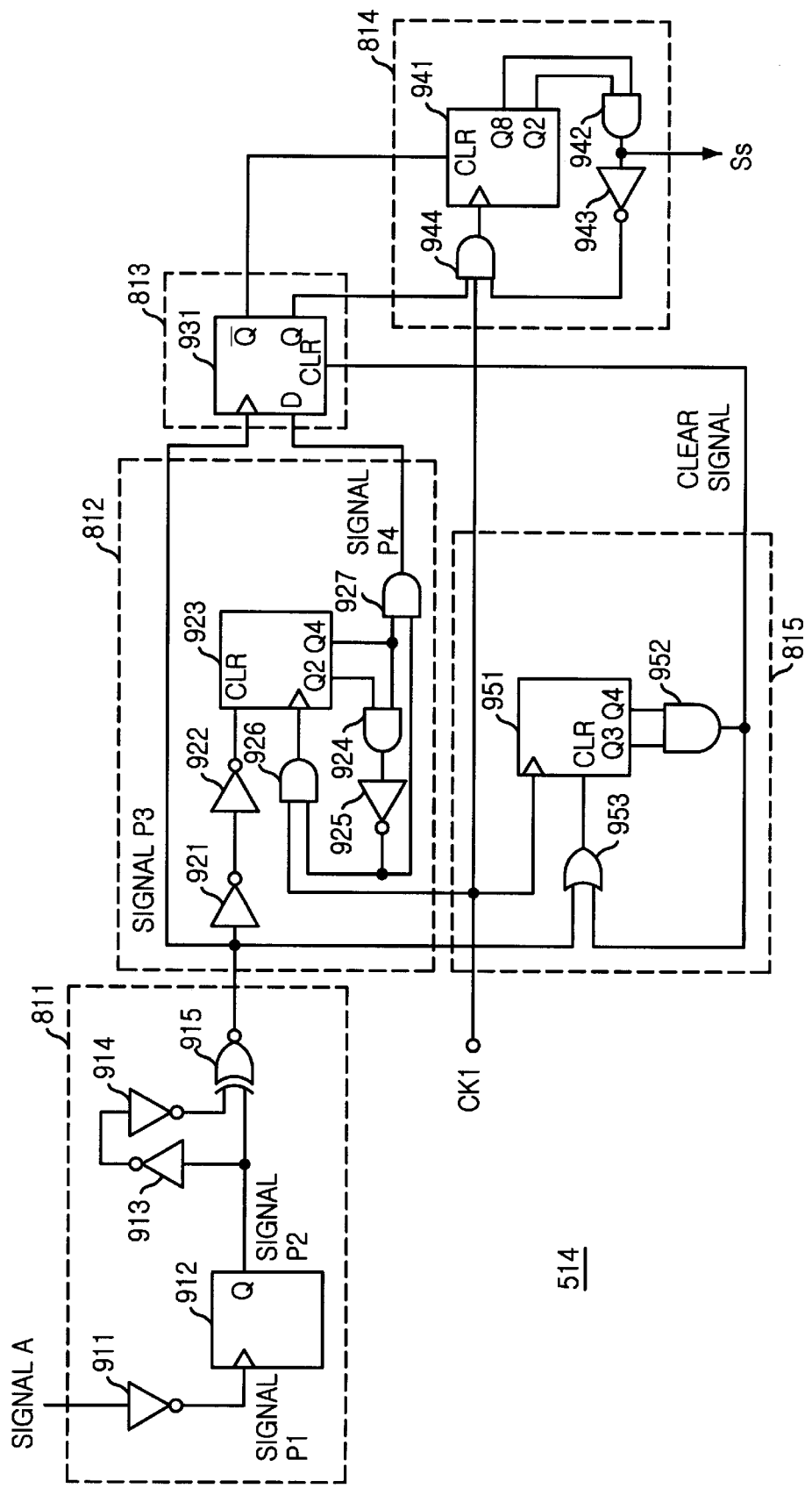
FIG. 9 is a circuit diagram illustrating a sound pattern detector shown in FIG. 8

FIG. 9 is a circuit diagram illustrating a sound-pattern detector.

Referring to FIG. 9, the edge detector 811 includes an inverter 911 for inverting an input signal to output a signal P1, a D flip flop 912 for receiving the signal Pi through a clock terminal and converting a period of the signal P1 to output a signal P2, a plurality of inverters 913 and 914, serially connected to each other, for delaying the signal P2 for a predetermined time, an exclusive OR (XOR) gate for XORing the signal P2 and an output signal of the inverter 914.

The pulse interval counter 812 includes a plurality of inverters 921 and 922, serially connected to each other, for delaying an output signal of the XOR gate 915 contained in the edge detector 811 for a predetermined time, a counter 923, whose clear terminal CLR is coupled to an output terminal of the inverter 922, for counting a signal inputted through a clock terminal and outputting a count value through a first output terminal Q2 and a second output terminal Q4, wherein the first output terminal Q2 outputs a high level when four clocks are inputted, and the second output terminal Q4 outputs a high level when eight clocks are inputted, an AND gate 924 for ANDing an output signal of the first output terminal Q2 and the second output terminal Q4, an inverter 925 for inverting an output signal of the AND gate 924, an AND gate 926 for ANDing the clock CK1 and an output signal of the inverter 925 to an ANDed signal to the clock terminal of the counter 923, and an AND gate 927 for ANDing a signal outputted through the second output terminal Q4 of the counter 922 and an output signal of the inverter 925 to output an ANDed signal to the setup period determinator 813.

The setup period determinator 813 includes a D flip flop 931 having a clock terminal coupled to the output terminal of the XOR gate 915 contained in the edge detector 811, an input terminal D coupled to the output terminal of the AND gate 927 contained in the pulse interval counter 812, a clear terminal CLR coupled to the output terminal of the clear signal generator 815, and output terminals Q2 and Q coupled to the detection signal generator 814.

The detection signal generator 814 includes a counter 941, whose clear terminal CLR is coupled to the output terminal Q2 of the D flip flop 931, for counting a signal inputted through a clock terminal to output a count value through a first output terminal Q2 and the second terminal Q8, an AND gate 942 for ANDing an output signal of the first output terminal Q2 and an output signal of the second output terminal Q8, an inverter 943 for inverting a signal outputted from an output terminal of the AND gate 942, an AND gate 944 for ANDing a signal outputted from the output terminal Q of the D flip flop 931 contained in the setup period determinator 813, the clock CK1 and an output signal of the inverter 943, to output an ANDed signal to the clock terminal of the counter 941. Here, the output signal of the AND gate 942 corresponds to the detection signal $S_s$.

The clear signal generator 815 includes a counter 951 for counting the clock CK1 inputted through a clock terminal to output a count value to a first output terminal Q3 and a second output terminal Q4, an AND gate 952 for ANDing signals outputted from the first and the second output terminals Q3 and Q4 to output an ANDed signal to the clear terminal CLR of the D flip flop 831 contained in the setup period determinator 813, and an AND gate 953 for ANDing an output signal of the AND gate 952 and an output signal of the XOR gate 951 contained in the edge detector 811 to output an ANDed signal to the clear terminal CLR of the counter 951.

Figure 10:
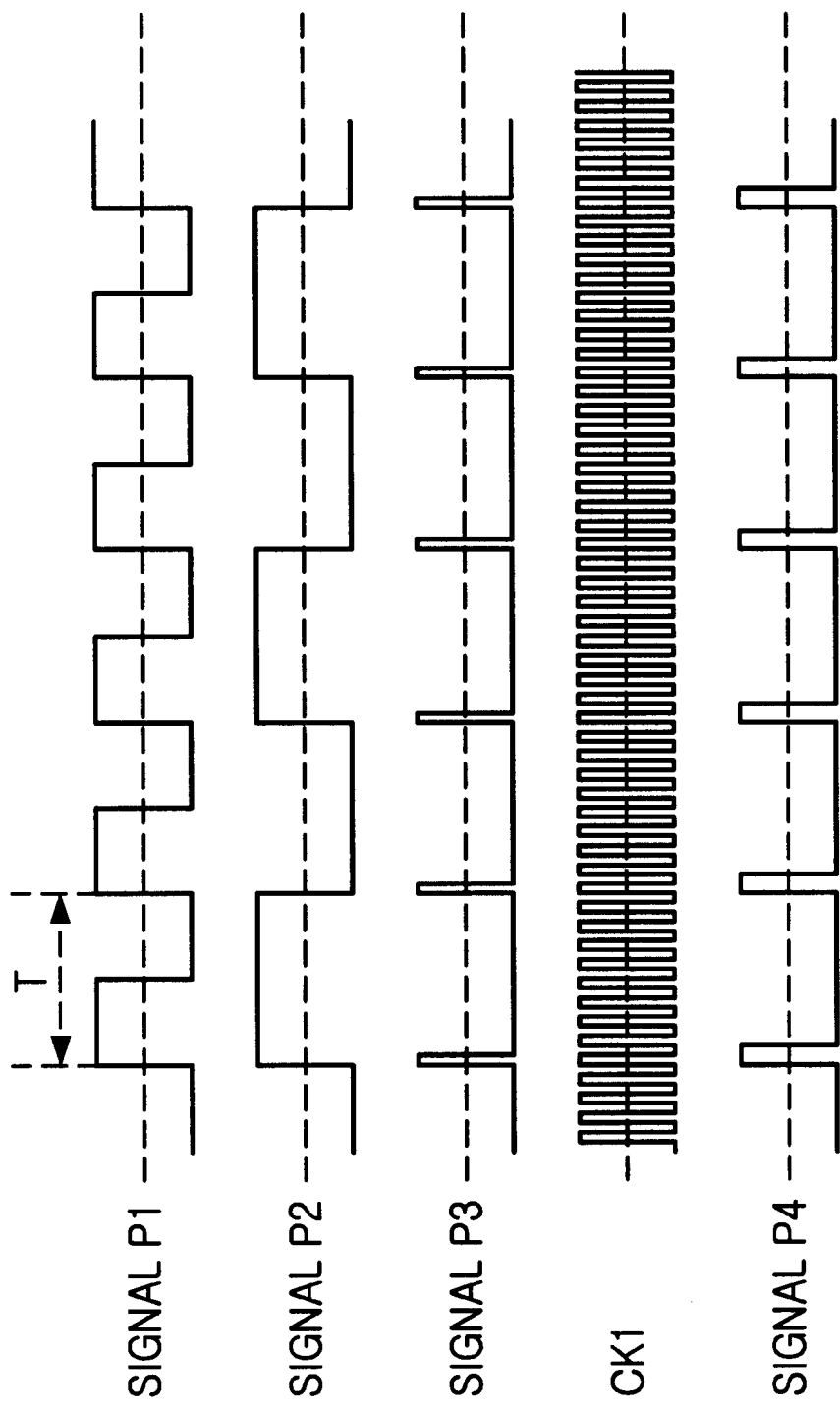
FIG. 10 is a timing chart illustrating a sound pattern detector shown in FIG. 9.

FIG. 10 illustrates a timing chart of the sound-pattern detector shown in FIG. 9. A reference symbol P1 is an output signal of the inverter 911, P2 an output signal of the D flip flop 912, P3 an output signal of the XOR gate 915, and P4 an output signal of the AND gate 927, respectively.

Referring to FIGS. 9 and 10, when a rectangular signal, i.e., the signal P1, outputted from the edge detector 811 is inputted to the clock terminal, the signal P1 is converted into a rectangular signal having a half the frequency of the signal P1.

After delaying the output signal from the D flip flop 912 by the inverters 913 and 914, a signal transferred from the D flip flop 912 to the XOR gate 915 and a signal delayed through the inverters 913 and 914, and then, the signal P3 as a pulse is outputted at the rising and the falling edges of the input signal.

Here, the clock CK1 is a rectangular clock having a frequency 8.5 to 9 times as many as the sound signal.

The counter 923 outputs a high level signal through the second output terminal Q4 when the number of the clocks CK1 is more than eight, and the counter 923 outputs a high level signal through the first and the second output terminals Q2 and Q4 when the number of the clocks CK1 is more than ten.

If the counter 923 outputs the high level signal, the output signal of the inverter 925 becomes a low level, and thus, the output signal of the AND gate 926 also becomes a low level. If the output signal of the AND gate 926 becomes the low level, the counter does not perform the count operation any longer, and the signal 24 outputted from the AND gate 927 becomes a low level.

Accordingly, when the signal P4 is the high level at the signal P3 in every period of the input signal, the output terminal Q of the D flip flop 931 is set to a high level. That is, in case where the number of the clocks CK1 within the period of the input signal is eight or nine, the output terminal Q of the D flip flop 931 is maintained at a high level. If the number of the clocks CK1 is less than eight or more than ten, the output terminal Q become a low level, and if the input signal having the setup period is continuously inputted, the output terminal Q is maintained at a high level.

Additionally, the output terminal of the D flip flop 931 is a high level, the detection signal $S_s$ is maintained at a high level. At this time, if the clock is not inputted to the D flip flop 931 until twelve of the clocks CK1 are counted, the counter 951 clears the D flip flop 931. That is, the output waveform of the D flip flop 931 is prevented from being set to continuously have a same value.

As an embodiment of the present invention, instead of using the phase difference detection unit for detecting the phase difference between signals, it is preferable to use a timer embedded in the microprocessor 127. That is, by generating a first control signal and a second control signal at the rising edge of the signal A and the rising edge of the signal B, respectively, a time difference between the first control signal and the second control signal is calculated. Then, a direction of the sound source can be detected by reading out a direction corresponding to the phase difference from the ROM 128 which stores directions corresponding to respective phase differences.

As described above, although the present invention describes the sound signal generating unit using the sound signal having the audio frequency, it is also applicable to the sound signal generating unit using an ultrasonic sound signal.

Hereinafter, the movement direction detection unit for detecting the movement of the robot shown in FIG. 1 will be described.

Referring back to FIG. 1, the movement direction detection unit 119 includes an electronic compass 120 for detecting an earth's magnetic field and an analog-to-digital converter 121 for converting detected analog values from the electronic compass 120 into digital values.

In the prior art, a conventional electronic compass for detecting directions is implemented with complicated circuits using coils or a method using magnetic-field detection sensors which are arranged in parallel to each other is employed. On the contrary, instead of using the coil, the present invention suggests a method for detecting the earth's magnetic field by coupling ferrite with typical hole sensors.

Figure 11:
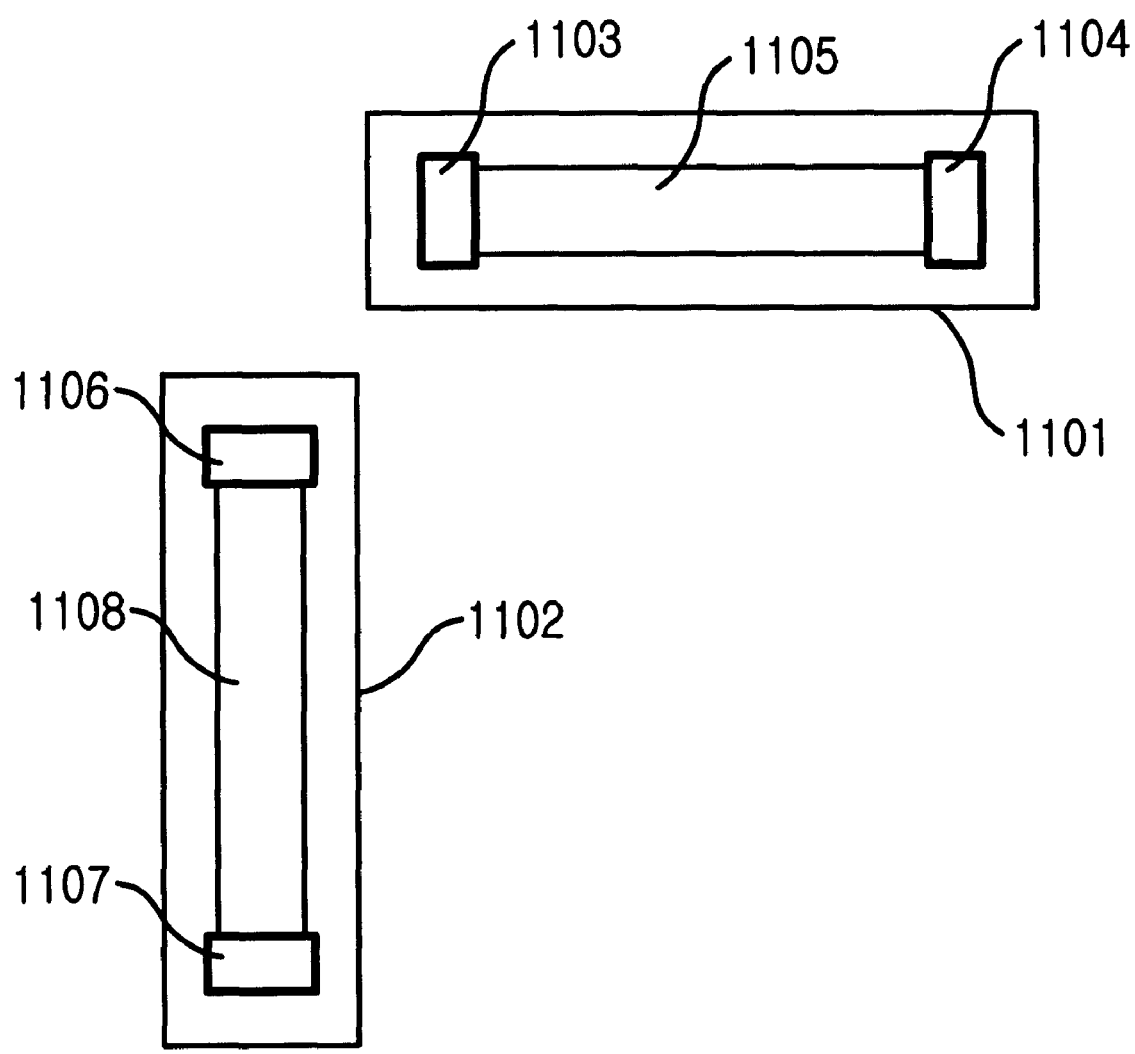
FIG. 11 is a diagram illustrating an electronic compass having hole sensors and ferrites, shown in FIG. 1.

FIG. 11 is a schematic view illustrating an arrangement of hole sensors and ferrites contained in an electronic compass.

Referring to FIG. 11, a first magnetic-field detection unit 1101 detects a direction of X axis with respect to the earth's magnetic field and a second magnetic-field detection unit 1102 detects a direction of Y axis with respect to the earth's magnetic field. The first and the second magnetic-field detection units 1101 and 1102 are arranged in parallel to each other. The first magnetic-field detection unit 1101 includes two hole sensors 1103 and 1104 coupled with the ferrite 1105, and the second magnetic-field detection unit 1102 has the same structure as the first magnetic-field detection unit 1101.

FIG. 12 is a circuit diagram illustrating an electronic compass as an embodiment of the present invention.

Referring to FIG. 12, in the first magnetic-field detection unit 1101, an output terminal of the hole sensor 1103 is coupled to a non-inverting terminal of an amplifier 1201, and an output terminal of the second hole sensor 1104 is coupled to a inverting terminal of the amplifier 1201 through a resistor R1. Furthermore, a resistor R3 and a capacitor C are coupled in parallel between the inverting terminal and an output terminal of the amplifier 1201, and a resistor R2 and a variable resistor VR are coupled between the inverting terminal of the amplifier 1201 and a ground terminal. The second magnetic-field detection unit 1102 has the same structure as the first magnetic-field detection unit 1101. Each output signal X and Y of the first and the second magnetic-field detection units 1101 and 1102 is transferred to the microprocessor 127 through the analog-to-digital converter 121, as shown in FIG. 1.

Figure 13:
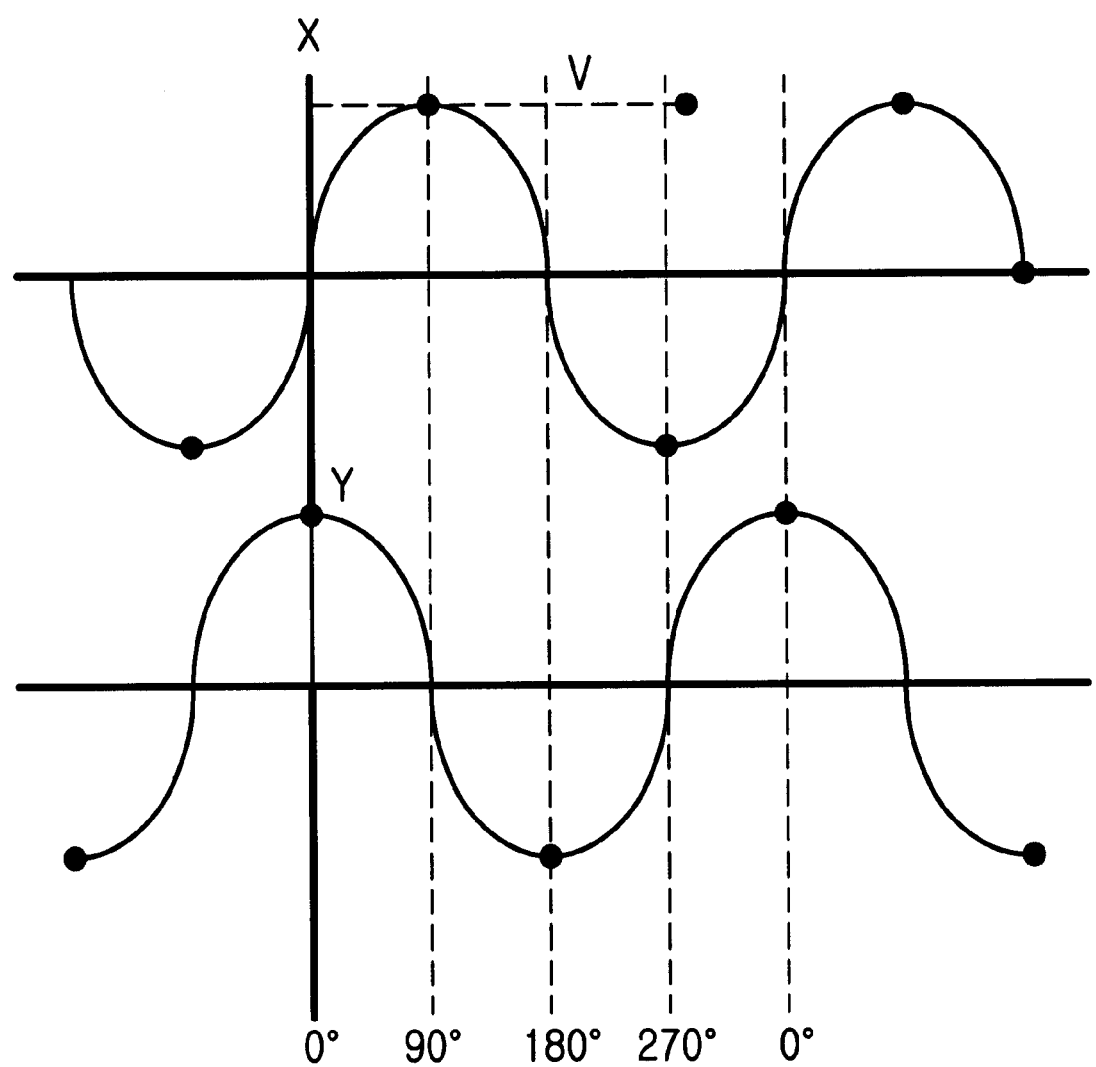
FIG. 13 is a diagram illustrating an angle of direction detected from an electronic compass.

FIG. 13 is a diagram illustrating an angle of direction according to output signals X and Y of the first and the second magnetic-field detection units 1101 and 1102.

Referring to FIG. 13, if the output signals X and Y of the first and the second magnetic-field detection units 1101 and 1102 are '0' and '1', respectively, it means a due north. If the output signals X and Y of the first and the second magnetic-field detection units 1101 and 1102 are '1' and '0', respectively, it means a due east. In such a manner, according to the output signals X and Y of the first and the second magnetic-field detection units 1101 and 1102, the angles of direction are stored in the ROM 128 in a table form, and if the microprocessor 127 requires the angle of the direction, specific angle corresponding to the output signals X and Y is read out from the ROM 128, to detect the current movement direction.

Hereinafter, an operation of the robot according to the present invention will be described.

Figure 14:
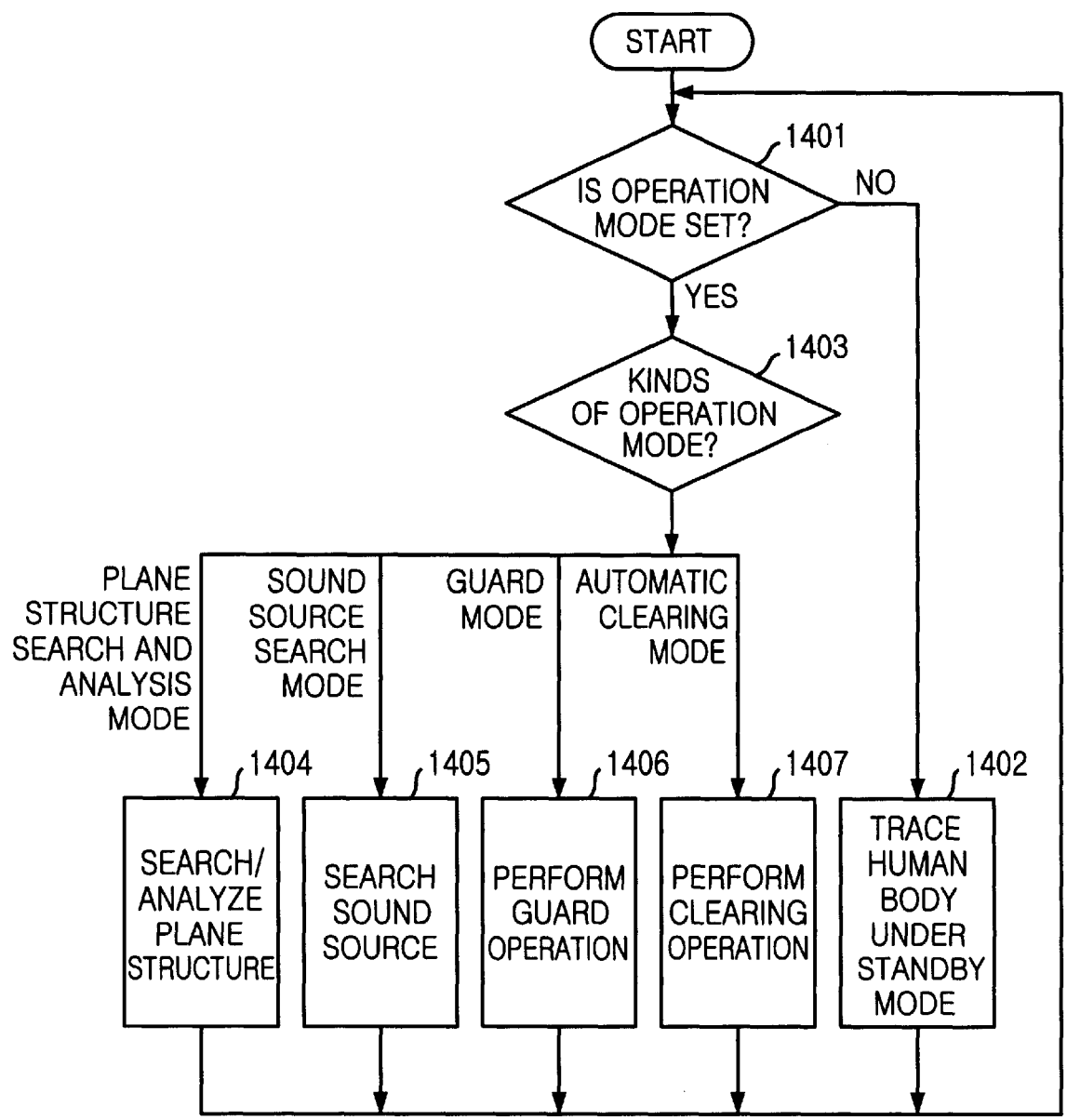
FIG. 14 is a flow chart illustrating an operation of a robot in accordance with the present invention.

FIG. 14 is a flow chart illustrating sequential steps of operating the robot according to the present invention.

Referring to FIG. 14, at step 1401, whether an operation mode is set or not is determined. At step 1402, if it is determined that the operation mode is not set, the robot maintains a standby mode and detects a human body. At this time, if the robot is in a shape of dog, a dog-shape robot is made to follow a human body by waving his tail. The operation mode is implemented by mounting a switch to the robot, or by using a remote controller, or by program which automatically selects the operation mode.

At step 1403, as a result of determination at the step 1401, if it is determined that the operation mode is set, kinds of the operation mode are checked, and then following operations are performed.

At step 1404, if it is determined that the operation mode is a plane structure search and analysis mode, the plane structure is searched and analyzed by calculating a left, a right, and a front distances.

At step 1405, if it is determined that the operation mode is a sound source search mode, a place of the sound source is searched and then the robot moves to the place of the sound source. At this time, if a sound signal generator is mounted to a charger, the robot searches and docks to the charger, to thereby charge automatically a battery mounted to the robot.

At step 1406, if it is determined that the operation mode is a guard mode, the robot performs a guard operation after passing a predetermined time when commands are transferred thereto.

At step 1407, if it is determined at the step 1403 that the operation mode is an automatic clearing mode, the robot searches and analyzes the plane structure having a predetermined space, and then clears up the predetermined space. At this time, a clearing things is mounted to the robot, and according to the movement of the robot, a possible space for clearing is in advance set up. The robot moves in a zigzag form and maintains a predetermined distance between the robot's body and the wall by rotating the motors little by little.

Figure 15:
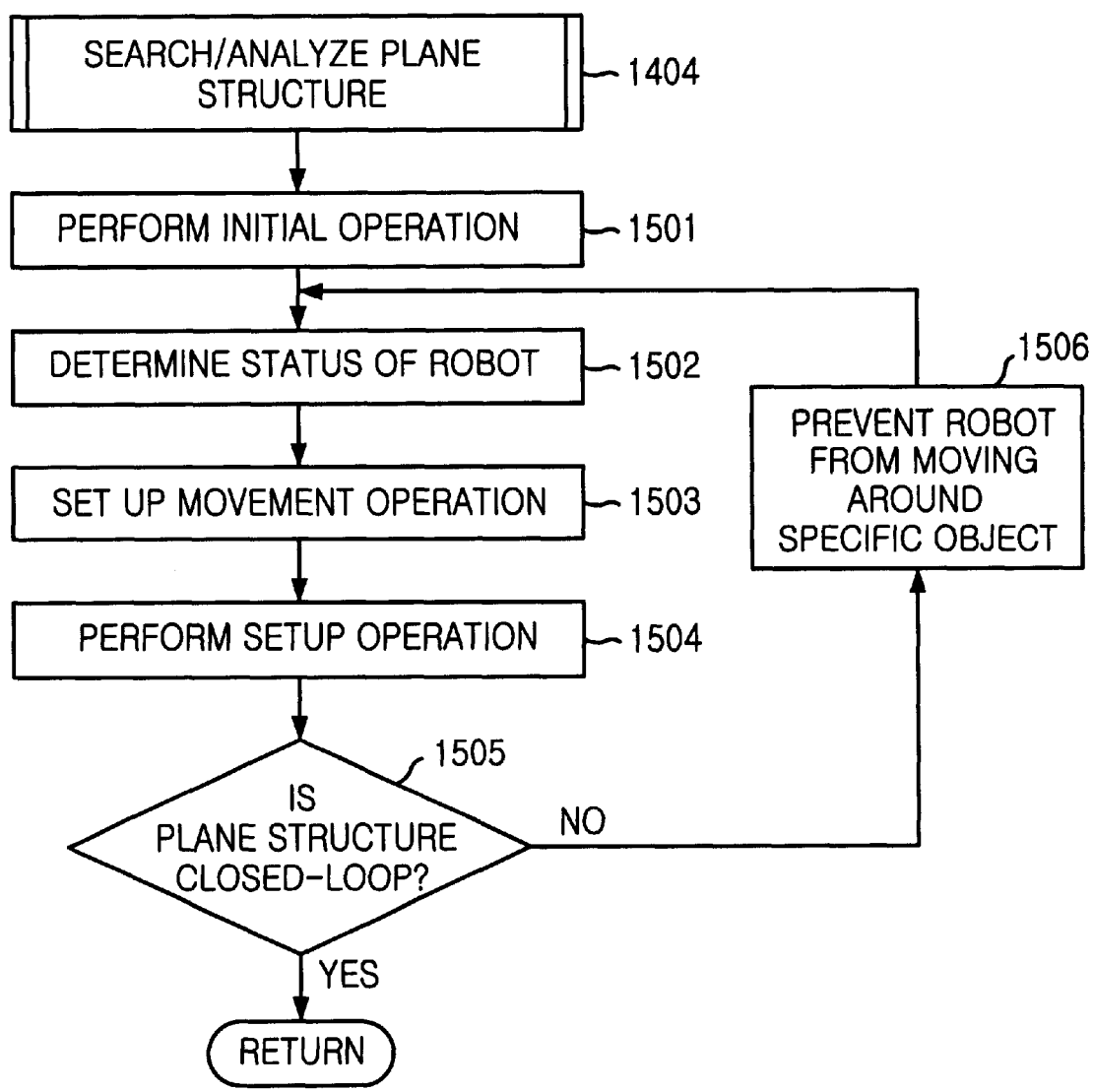
FIG. 15 is a flow chart illustrating sequential steps of searching and analyzing a plane structure.

FIG. 15 is a flow chart illustrating sequential steps of a plane structure search and analysis.

Referring to FIG. 15, at step 1501, the distance measurement unit 122 measures a distance between the robot and a left-side, a right-side, and a front-side walls, respectively, and an initial operation for moving to the nearest wall is performed. At this time, there are a right-side priority mode for moving along the right-side wall and a right-side priority mode for moving along the left-side wall.

At step 1502, after performing the initial operation, distances between the robot and the walls disposed at the right, the left and the front directions are calculated by the distance measurement unit 122 and a movement direction of the robot is detected by the movement-direction detection unit 119. Then, a status of the robot is determined by using information on the detected distance and the movement direction.

At step 1503, the microprocessor 127 determines an operation to be performed by using a previous status of the robot stored in the RAM 129 and a current status of the robot.

At step 1504, a setup operation is performed. At this time, if the robot does not move to a desired direction, the movement direction is automatically corrected.

At step 1505, whether a structure to be searched is a closed-loop is analyzed by using the current coverage distance and a coverage direction. If the structure is the closed-loop, the plane structure analysis is finished. At this time, the analyzed information is used to perform a clearing or move to a specific place.

At step 1506, if it is determined that the structure is not the closed-loop, the robot is prevented from moving around a specific object and the step 1502 for determining the status of the robot is repeated.

Meanwhile, the status of the robot's movement, commands for movements, movement distance, information related to the movement direction, and current-analyzing information are stored in the RAM 129.

Figure 16:
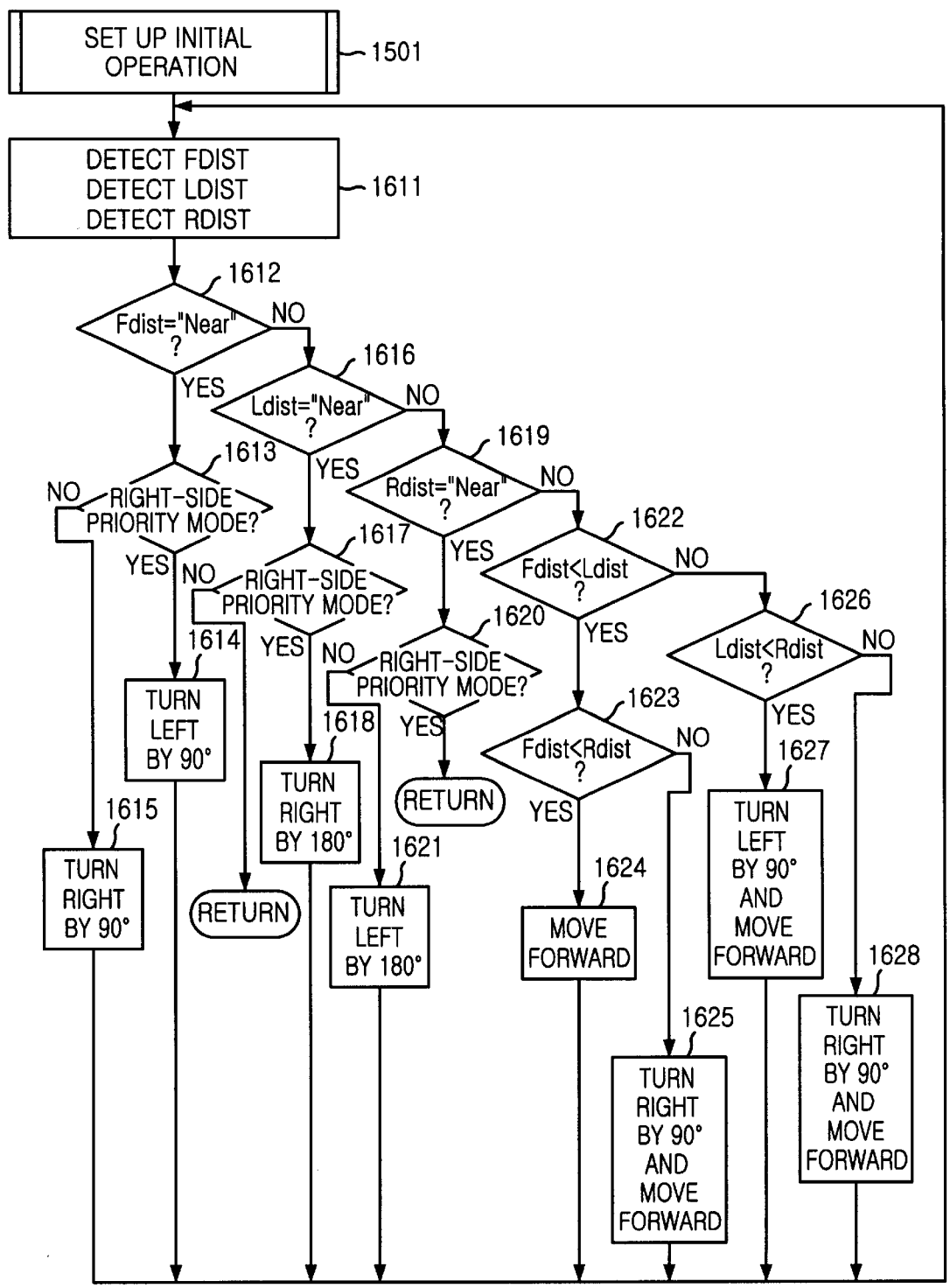
FIG. 16 is a flow chart illustrating sequential steps of an initial operation.

FIG. 16 is a flow chart illustrating sequential steps of the initial operation in FIG. 15.

Referring to FIG. 16, at step 1611, a distance between a current position of the robot and a front object, a front distance Fdist, a left-side distance Ldist between the current position of the robot and an object disposed at a left-side, and a right-side distance Rdist between the current position of the robot and an object disposed at a right-side are measured. At step 1612, whether the front distance Fdist is equal to a reference near distance Near is determined. Here, the reference near distance Near represents a value for determine near distance. Additionally, the reference near distance is used to determine that the robot may collide with an object around the robot.

At step 1613, if it is determined that the front distance Fdist is equal to the reference near distance Near, the robot is turned left and then determines whether a current mode is the right-side priority mode in order that the right-side distance Rdist is the reference near distance Near.

At step 1611, in case of the right-side priority mode is, the robot is turned left a much as 90°, to there make the right-side distance Rdist equal to the reference near distance Near, and then the step 1611 is repeated.

At step 1615, if it is determined that the right-side priority mode is not, the robot is turned right as much as 90°, to there make the right-side distance Ldist equal to the reference near distance Near, and then the step 1611 of the distance measurement is repeated.

At step 1616, if it is determined at the step 1612 that the front distance Fdist is not equal to the reference near distance Near, whether the right-side distance Ldist is equal to the reference near distance Near is determined. At step 1617, if not equal, a step of determining whether the right-side priority mode is or not is performed.

At step 1618, if it is determined that the right-side priority mode is, the robot is turned right as much as 180°, to thereby make the right-side distance Rdist equal to the reference near distance Near. Then, the step 1611 is repeated.

If it is determined at the step 1617 that the right-side priority mode is not, the step 1502 for determining the status of the robot is repeated in a state that the right-side distance Rdist is equal to the reference near distance Near.

At step 1619, if it is determined at the step 1616 the right-side distance Ldist is not equal to the reference near distance Near, whether the right-side distance Rdist is equal to the reference near distance Near is determined. At step 1620, whether the right-side priority mode is or not is determined.

If it is determined at the step 1620 that it is the right-side priority mode, the step 1520 for determining the status of the robot is repeated in a state that the right-side distance Rdist is equal to the reference near distance Near.

At step 1621, if it is determined at the step 1620 that it is not the right-side priority mode, the robot is turned left as much as 180°, to thereby make the right-side distance Rdist equal to the reference near distance Near. Then, the step 1611 of the distance measurement is performed.

At step 1622, if it is determined that the right-side distance Rdist is not equal to the reference near distance Near, whether the front distance Fdist is smaller than the left-side distance Ldist is determined. At step 1623, if the right-side distance Rdist is smaller than the reference near distance Near, whether the front distance Fdist is smaller than the right-side distance Rdist is determined.

At step 1624, it is determined that the front distance Fdist is smaller than the right-side distance, the robot moves forward, and then the step 1611 of the distance measurement is performed.

At step 1625, if it is determined at the step 1623 that the front distance Fdist is greater than the right-side distance Rdist, the robot is turned right as much as 180° and moves forward, and then the step 1611 is performed.

At step 1626, if it is determined at the step 1622 that the front distance Fdist is greater than the left-side distance, whether the right-side distance Rdist is greater than the left-side distance Ldist is determined. At step 1627, if the right-side distance Rdist is greater than the left-side distance Ldist, the robot is turned left as much as 90° and moves forward. Then, the step 1611 of the distance measurement is performed.

At step 1628, if it is determined at the step 1626 that the right-side distance Rdist is smaller than the left-side distance, the robot is turned right as much as 90° and moves forward. Then, the step 1611 is performed.

Figure 17:
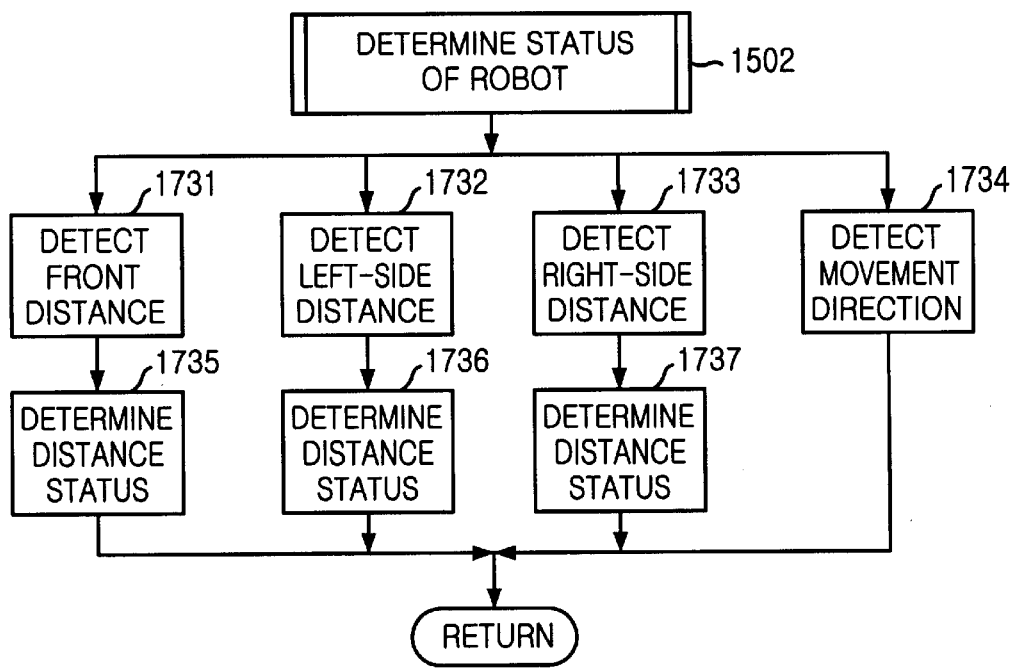
FIG. 17 is a flow chart illustrating sequential steps of determining a status of a robot.

FIG. 17 is a flow chart illustrating sequential steps of determining the status of the robot in FIG. 15.

Referring to FIG. 17, at step 1731, a front distance between the robot and a wall disposed at a current moving direction of the robot is detected. At step 1732, the left-side distance between a left-side wall and the robot is detected. At step 1733, the right-side distance between a right-side wall and the robot is detected. At step 1734, a current moving direction of the robot is detected in order to obtain information for conversion of a moving status of the robot.

At steps 1735, 1736 and 1737, respective status with respect to a detected front distance, a detected left-side distance and a detected right-side distance are determined.

Figure 18:
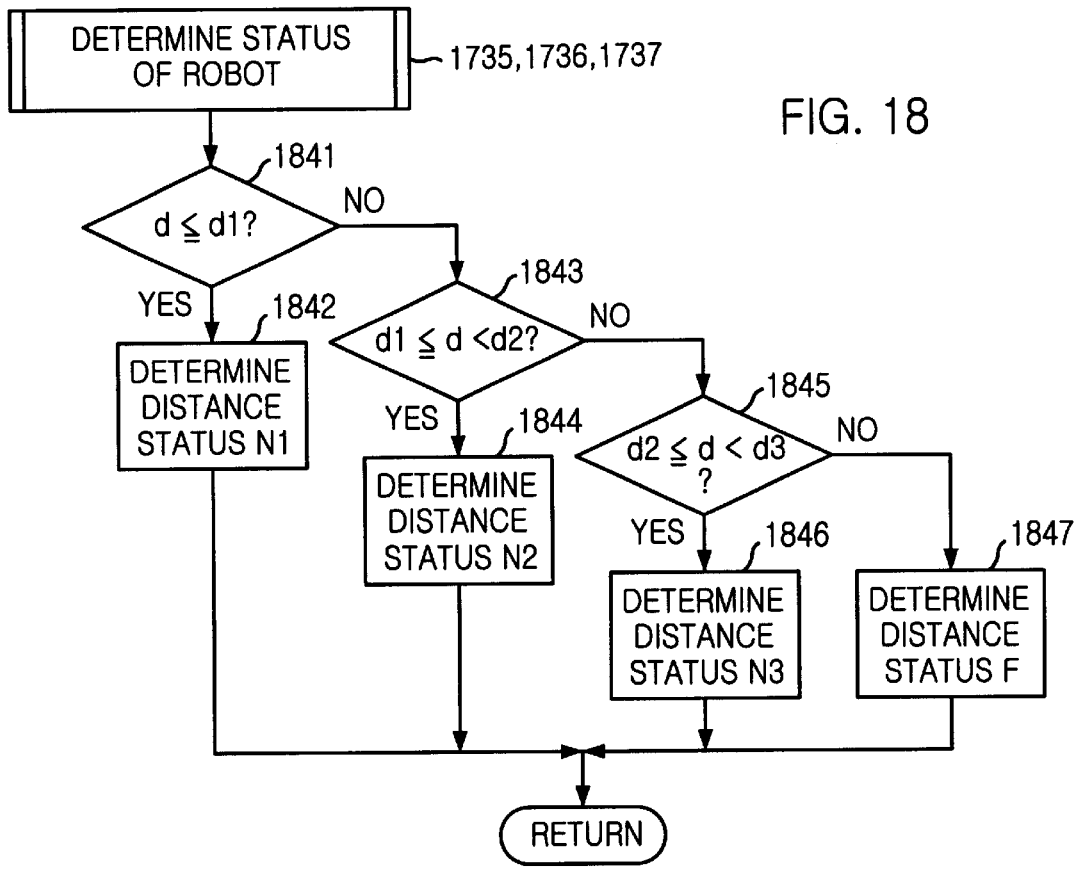
FIG. 18 is a flow chart illustrating sequential steps of changing movement direction.

FIG. 18 is a flow chart illustrating sequential steps of changing a movement direction of the robot.

Referring to FIG. 18, at step 1841, whether respective detected distance d is equal to or smaller than a predetermined reference distance $d_1$ is determined. At step 1842, if the detected distance d is equal co or smaller than the reference distance $d_1$, the distance status is determined as N1. Here, N1 represents a distance nearer than an appropriate distance.

At step 1843, it is determined as the step 1841 chat the detected distance d is greater than the reference distance $d_1$, whether the detected distance d is equal to or greater than a reference distance $d_2$ is determined. At step 1844, if it is determined that the detected distance d is equal to or greater than the reference distance $d_1$, and smaller than the reference distance $d_2$, the distance status is determined as N2. Here, the N2 represents the appropriate distance.

At step 1845, if it is determined at the step 1843 that the detected distance d is not equal to or greater than the reference distance $d_1$ and not smaller than the reference distance $d_2$, whether the detected distance d is equal to or greater than the reference $d_2$, and smaller than a predetermined reference distance $d_3$ is determined. At step 1846, if the detected distance is equal to or greater than the reference distance $d_2$, and smaller than the reference distance $d_3$, the distance status is determined as N3. Here, the N3 represents a distance which is a little farther than the appropriate distance.

At step 1847, if the detected distance d is smaller than the reference distance $d_2$, and equal to or greater than the reference distance $d_3$, the distance status is determined as F. Here, the F represents a distance much farther than the appropriate distance.

The robot maintains a distance between the wall and the robot's body to the appropriate distance N2 when moving along the wall. In case where the distance status is the N1, the movement direction is adjusted little by little to make the distance status to be the N1. Additionally, in case where the distance status is the N3, the movement direction is adjusted little by little to a direction of the N2, to make the distance status to be the N2.

Tables 1 and 2 shows an operation of the robot, which is set in FIG. 15.

The table 1 shows an operation according to the status of the robot in the right-side priority mode, and the table 2 shows an operation according to the status of the robot in the left-side priority mode.

TABLE 1

| CURRENT STATUS | OPERATION COMMAND | SETUP ENVIRONMENT AND REFERENCE |
|---|---|---|
| S (N, N, N) | RG | Default |
|  | TL | In case of sum of left-side distance and right-side distance $\geq$ dr (dr: minimum space for rotation of robot) |
| S (N, N, F) | TR-FG | Default |
| S (N, F, N) | TL-FG | Default |
|  | TR-FG | Default |
| S (F, N, N) | TL-FG | In case where previous status is S (F, F, F) and, previous operation command is TR-FG. In case where previous operation command is TL |
| S (F, N, F) | FG | Default |
|  | RG | In case where previous operation command is RG |
|  | TL | In case where previous operation command is RG or TL, and sum of left-side distance and right-side distance $\geq$ dr (dr: minimum space for rotation of robot) |
| S (F, N, F) | TR-FG | Default |
|  | TL | In case where previous operation command is RG |
|  | FG | Default |
|  | TLx-FG | In case where previous status is S (F, F, F), previous operation command is FG, and current distance status is N1 |
| S (F, F, N) | TRx-FG | In case where previous status is S (F, F, F), previous operation command is FG, and current right-side distance status is N3 |
|  | TL | In case where previous operation command is RG |
| S (F, F, F) | TR-FG | Default |
|  | FG | In case where previous operation command of TR-FG is generated in four successive times In case where previous operation command of TL is generated in four successive times |
|  | TL | In case where previous status is S (F, F, F), and previous operation command is FG |
|  | TL | In case where previous operation command is RG and TL |

TABLE 1

| CURRENT STATUS | OPERATION COMMAND | SETUP ENVIRONMENT AND REFERENCE |
|---|---|---|
| S (N, N, N) | RG | Default |
|  | TR | In case of sum of left-side distance and right-side distance $\geq$ dr (dr: minimum space for rotation of robot) |
| S (N, N, F) | TR-FG | Default |
| S (N, F, N) | TL-FG | Default |
| S (F, N, N) | TL-FG | Default |
|  | TR-FG | In case where previous status is S (F, F, F) and, previous operation command is TL-FG. In case where previous operation command is TR |

TABLE 1-continued

| CURRENT STATUS | OPERATION COMMAND | SETUP ENVIRONMENT AND REFERENCE |
|---|---|---|
| S (F, N, F) | FG | Default |
| | RG | In case where previous operation command is RG |
| | TR | In case where previous operation command is RG or TR, and sum of left-side distance and right-side distance ≧ dr (dr: minimum space for rotation of robot) |
| S (F, N, F) | FG | Default |
| | TRx-FG | In case where previous status is S (F, F, N), and previous operation command is FG, and current left-side distance is N3 |
| | TLx-FG | In case where previous status is S (F, F, F), and previous operation command is FG, and current right-side distance is N3 |
| | TR | In case where previous operation command is RG |
| S (F, F, N) | TL-FG | Default |
| | TR | In case where previous operation command is RG |
| | TL-FG | Default |
| S (F, F, F) | FG | In case where previous operation command of TL-FG is generated in four successive times
In case where previous operation command of TR is generated in four successive times
In case where previous status Is S (F, F, F), and previous operation command is FG |
| | TR | In case where previous operation command is RG and TL |

In the tables 1 and 2, FG represents an operation command for moving forward, RG an operation command for moving backward, TL an operation command for turning left as much as 90°, TR an operation command for turning right as much as 90°, TLx an operation command for turning left as much as x°, and TRx an operation command for turning right as much as x°. A default represents an operation command for continuously performing an operation of a current status.

(d1+d2)/2 is a central of the N2 and is a reference value used for determining whether a space for turning of the robot is enough. Here, d1 and d2 are reference distance values for determining the distance status of N1, N2 and N3.

Meanwhile, if the S(F,F,F) is kept on for a predetermined time, it is determined as an error.

An operation of the robot according to the present invention will be described in detail with reference to the tables 1 and 2.

Operation commands are set up according to the current operation status and the previous operation status, as shown in the tables 1 and 2.

For example, in the operation status of S (N,F,F), a first term presents a status of the front distance, a second term presents a status of the left-side distance, and a third term represents a status of the right-side distance.

In order to maintain the distance status N2, if the operation status is S(F,F,N) in the mode of moving along the right-side wall, operation commands such as TLx and TRx are used to make the distance status to be N2.

Additionally, TLx represents a turning left as much as x°, and TRx represents a turning right as much as x°. At this time, x corresponds to an angle of $\tan^{-1}$ (RMS). Here, RMS is a value obtained by diving a subtracted value of a current right distance and a previous right distance by a current movement distance.

Since the robot according to the present invention has a function of error correction with respect to a processed result, correction of a performance of the operation and error operation is achieved only by operation commands. At this time, the operation commands include FG for moving forward and RG for moving reverse (backward), and TL(θ) for turning left as much as a predetermined angle and TR(θ) for turning right as much as a predetermined angle. Here, θ is a angle for rotation, and if there is no angle, it means 90°.

An operation of the right-side priority mode will se described with reference to the table 1.

The distance status N can be divided into N1, N2, and N3.

Since the distance status N1 is near to the wall, the robot cannot rotate, and the distance status N2 is a proper distance to rotate. The distance status N3 is out of the proper distance and the distance status F means a distance much farther than the distance status N3. In particular, in the operation of the forward or backward movement, the robot moves by a predetermined distance.

First, if, at a current status, the front distance status is N, the left-side distance status is N, and the right-side distance status is N, if a sum of the right-side distance and the right-side distance is greater than the dr, an operation of turning left as much as 90° is set. Here, the symbol dr is a minimum space required for the robot to rotate.

At this time, if the sum of the left-side distance and the right-side distance is not greater than the dr, an operation of the backward movement is set.

Second, if, at the current status, the front distance status is N, the left-side distance status is N, and the right-side distance status is F, the robot is turned right as much as 90° and an operation of the forward movement is then set.

Third, if, at the current status, the front distance status is N, the left-side distance status is F, and the right-side distance status is N, the robot is turned left as much as 90° and an operation of the forward movement is then set.

Fourth, if, at the current status, the front distance status is N, the left-side distance is F, and the right-side distance is F, and if a previous operation is a turning left as much as 90°, the robot is turned left as much as 90° and an operation of the forward movement is set.

If, at the previous status, the front distance states is F, the left-side distance status is F, the right-side distance status is F, and if the previous operation is a turning right as much as 90° and then is an operation of the forward movement, the robot is turned left as much as 90° and an operation of the forward movement is set.

Furthermore, if, at the previous status, the front distance status is F, the left-side distance status is F, the right-side distance status is F, and if the previous operation is a turning right as much as 90° and then is not an operation of the forward movement, the robot is turned right as much as 90° and an operation of the forward movement is then set.

Fifth, if, at the current status, the front distance status is F, the left-side distance status is N and the right-side distance status is N, and if the previous operation is an operation of the backward movement or a turning left as much as 90° and a sum of the left-side distance and the right-side distance is greater than the dr, an operation of a turning left as much as 90° is set. Here, the dr represents a minimum space required for the robot to rotate.

At this time, if the previous operation is not a turning left as much as 90° but an operation of the backward movement, an operation of the backward movement is set.

If the previous operation is not the operation of the backward movement, an operation of the forward movement is set.

Sixth, if, at the current status, the front distance status is F, the left-side distance status is N and the right-side distance status is F, and if the previous operation is a backward movement, the robot is turned left as much as 90° is set.

If the previous operation is not the backward movement, the robot is turned right as much as 90° and an operation of the forward movement is set.

Seventh, if, at the current status, the front distance status is F, the left-side distance status is F and the right-side distance status is N, and if the previous operation is the backward movement, an operation of turning left as much as 90° is set.

If, a current right-side distance status is N1, a previous front distance status is F, a previous left-side distance status is F, a previous right-side distance status is N, and if the previous operation is the forward movement, the robot is turned left as much as an angle of x and then an operation of the forward movement is set. Here, x represents a predetermined minimum unit angle or an inverse tangent ($\tan^{-1}$) of an angle obtained by diving a difference between the current right-side distance and the previous right-side distance by a current coverage distance.

Furthermore, if the current right-side distance status is N3, the previous front distance status is F, the previous left-side distance status is F, the previous right-side distance status is N, and if the previous operation is the forward movement, the robot is turned right as much as an angle of x and then an operation of the forward movement is set. Here, x represents a predetermined minimum unit angle or an inverse tangent ($\tan^{-1}$) of an angle obtained by diving a difference between the current right-side distance and the previous right-side distance by a current coverage distance.

Eighth, if the current front distance status is F, the current left-side distance status is F, the right-side distance status is F, and if the previous operation is performed with a turning left as much as 90° at four successive times, an operation of the forward movement is set.

At this time, if, at the previous operation, the turning left as much as 90° is not performed for four successive times but the turning right as much as 90° is performed for four successive times and then an operation of the forward movement is performed, an operation of the forward movement is set.

If, at the current status, the front distance status is F, the left-side distance status is F, the right-side distance status is F, and if the previous operation is the forward movement, an operation of the forward movement is set. Here, if the previous operation is not the forward movement but the backward movement or a turning left as much as 90°, an operation of turning left as much as 90° is set.

Furthermore, if the previous operation is not the forward or the backward movements, or the turning left as much as 90°, the robot is turned left as much as 90° and then an operation of the forward movement is set.

The above-described eight setups of operations are steps for setting up the operation commands according to the robot's status.

An operation of the robot according to the present invention will be described in detail with reference to the tables 1 and 2.

Operation commands are set up according to the current operation status and the previous operation status, as shown in the tables 1 and 2.

For example, in the operation status of S (N, F, F), a first term presents a status of the front distance, a second term presents a status of the left-side distance, and a third term represents a status of the right-side distance.

In order to maintain the distance status N2, if the operation status is S(F,F,N) in the mode of moving along the right-side wall, operation commands such as TLx and TRx are used to make the distance status to be N2.

Additionally, TLx represents a turning left as much as x°, and TRx represents a turning right as much as x°. At this time, x corresponds to an angle of $\tan^{-1}$ (RMS). Here, RMS is a value obtained by diving a subtracted value of a current right distance and a previous right distance by a current movement distance.

Since the robot according to the present invention has a function of error correction with respect to a processed result, correction of a performance of the operation and error operation is achieved only by operation commands. At this time, the operation commands include FG for moving forward and RG for moving reverse (backward), and TL($\theta$) for turning left as much as a predetermined angle and TR($\theta$) for turning right as much as a predetermined angle. Here, $\theta$ is a angle for rotation, and if there is no angle, it means 90°.

An operation of the left-side priority mode will be described with reference to the table 2.

The distance status N can be divided into N1, N2, and N3.

Since the distance status N1 is near to the wall, the robot cannot rotate, and the distance status N2 is a proper distance to rotate. The distance status N3 is out of the proper distance.

The distance status F means a distance much farther than the distance status N3. In particular, in the operation of the forward or backward movement, the robot moves by a predetermined distance.

First, if, at a current status, the front distance status is N, the left-side distance status is N, and the right-side distance status is N, if a sum of the right-side distance and the right-side distance is greater than the dr, an operation of turning right as much as 90° is set. Here, the symbol dr is a minimum space required for the robot to rotate.

At this time, if the sum of the left-side distance and the right-side distance is not greater than the dr, an operation of the backward movement is set.

Second, if, at the current status, the front distance status is N, the left-side distance status is N, and the right-side distance status is F, the robot is turned right as much as 90° and an operation of the forward movement is then set.

Third, if, at the current status, the front distance status is N, the left-side distance status is F, and the right-side distance status is N, the robot is turned left as much as 90° and an operation of the forward movement is then set.

Fourth, if, at the current status, the front distance status is N, the left-side distance is F, and the right-side distance is F, and if a previous operation is a turning right as much as 90°, the robot is turned right as much as 90° and an operation of the forward movement is set.

If, at the previous status, the front distance status is F, the left-side distance status is F, the right-side distance status is F, and if the previous operation is a turning left as much as 90° and then is an operation of the forward movement, the robot is turned right as much as 90° and an operation of the forward movement is set.

Furthermore, if, at the current status, the front distance status is N, the left-side distance status is F, the right-side distance status is F, and if the previous operation is not a turning right as much as 90°, or if the previous front distance status is F, the previous left-side distance status is F, and the right-side distance status is F, and if the previous operation is not the turning left as much as 90° and then the forward movement, the robot is turned left as much as 90° and an operation of the forward movement is then set.

Fifth, if, at the current status, the front distance status is F, the left-side distance status is N and the right-side distance status is N, and if the previous operation is an operation of the backward movement or a turning right as much as 90° and a sum of the left-side distance and the right-side distance is greater than the dr, an operation of a turning right as much as 90° is set. Here, the dr represents a minimum space required for the robot to rotate.

At this time, if the previous operation is an operation of the backward movement, an operation of the backward movement is set.

If the previous operation is not the operation of the backward movement, an operation of the forward movement is set.

Sixth, if, at the current status, the front distance status is F, the left-side distance status is N and the right-side distance status is F, and if the previous operation is a backward movement, the robot is turned right as much as 90° is set.

If the current right-side distance status is N1, the previous front distance status is F, the left-side distance status is N, and the right-side distance status is F, and if the previous operation is the forward movement, the robot is turned right as much as an angle of x and an operation of the forward movement is set. Here, x represents a predetermined minimum unit angle or an inverse tangent ($\tan^{-1}$) of an angle obtained by diving a difference between the current right-side distance and the previous right-side distance by a current coverage distance.

Furthermore, if the current right-side distance status is N3, the previous front distance status is F, the previous left-side distance status is F, the previous right-side distance status is F, and if the previous operation is the forward movement, the robot is turned left as much as an angle of x and then an operation of the forward movement is set. Here, x represents a predetermined minimum unit angle or an inverse tangent ($\tan^{-1}$) of an angle obtained by diving a difference between the current right-side distance and the previous right-side distance by a current coverage distance.

At this time, if the previous operation is not the forward movement, an operation of the forward movement is set.

Seventh, if, at the current status, the front distance status is F, the left-side distance status is F and the right-side distance status is N, and if the previous operation is the backward movement, an operation of turning right as much as 90° is set.

At this time, if the previous operation is not the backward movement, the robot is turned left as much as 90° and an operation of the forward movement is set.

Eighth, if the current front distance status is F, the current left-side distance status is F, the right-side distance status is F, and if the previous operation is performed with a turning right as much as 90° at four successive times, an operation of the forward movement is set.

At this time, if, at the previous operation, the turning left as much as 90° is performed for four successive times and an operation is the forward movement, an operation of the forward movement is set.

If, at the previous status, the front distance status is F, the left-side distance status is F, the right-side distance status is F, and if the previous operation is the forward movement, an operation of the forward movement is set.

At this time, if the previous operation is the forward movement or an operation of the forward movement, an operation of the forward movement is set.

Here, if the previous operation is not the backward or the turning right, the robot is turned left as much s 90° and then an operation of the forward movement is set.

Figure 19:
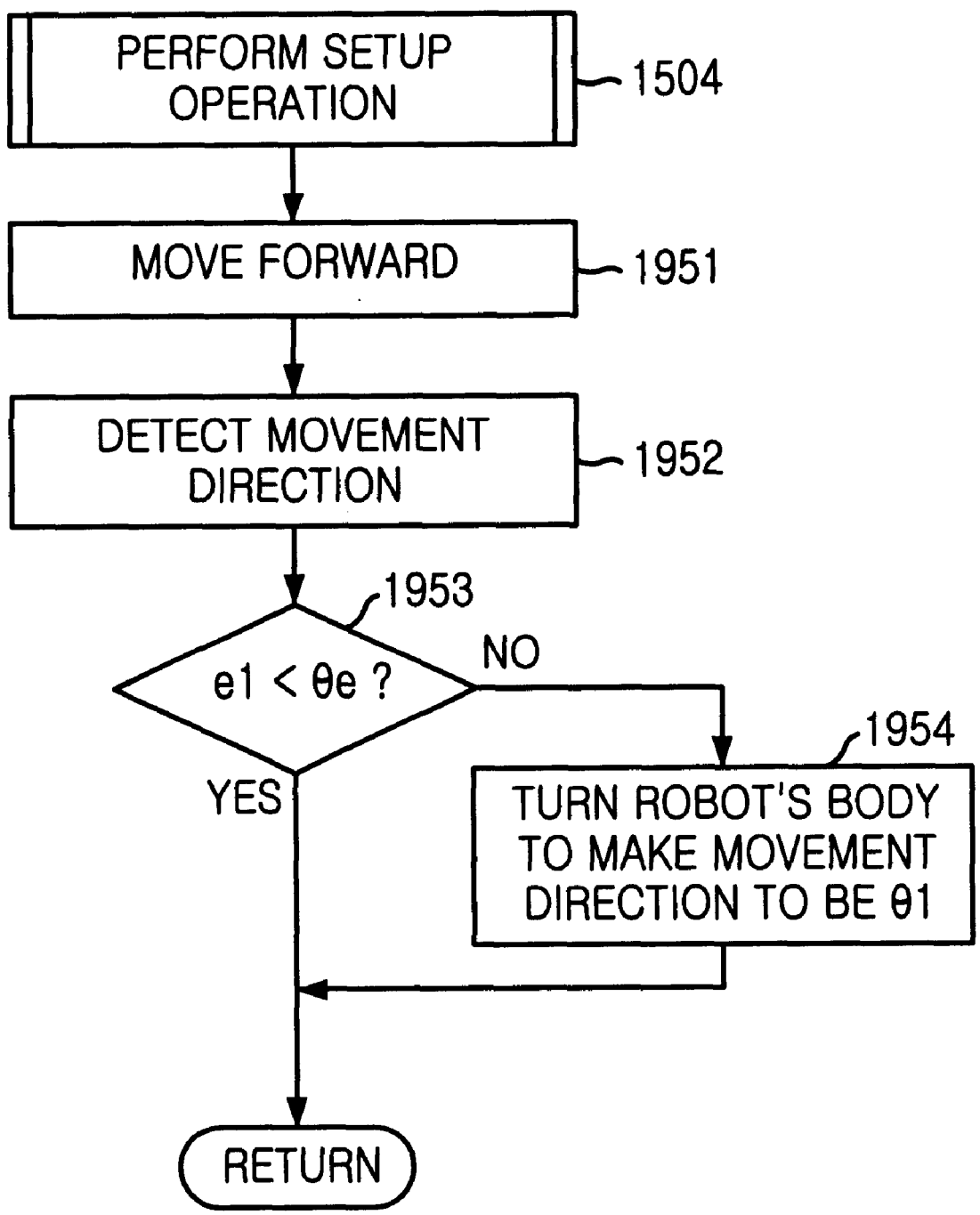
FIG. 19 is a flow chart illustrating sequential steps of a setup operation in FIG. 15 in accordance with an embodiment of the present invention.

The above-described eight setups of operations are steps for setting up the operation commands according to the robot's status;

FIG. 19 is a flow chart illustrating sequential steps of the setup operation in FIG. 15 when the robot moves forward. Here, the movement unit 132 includes a left and a right motors.

Referring to FIG. 19, at step 1951, the robot moves forward by rotating the left and the right motors in a forward direction by a predetermined number. At step 1952, a robot's movement direction is detected through the electronic compass, in order to correct a deviated direction due to a collision with the ground or obstacles.

At step 1953, whether an error value e1 corresponding to a difference between a detected forward direction $\alpha 1$ and an original forward direction $\theta_2$ is smaller than a predetermined minimum direction error value $\theta_e$ is determined. If the error value e1 is smaller than the minimum direction error value $\theta_e$, an operation for correction the robot's body in the forward movement is finished.

At step 1954, if it is determined at the step 1953 that the error value e1 is not smaller than the minimum direction error value $\theta_e$, the robot's body is rotated to thereby be in the original forward direction $\theta_1$.

Figure 20:
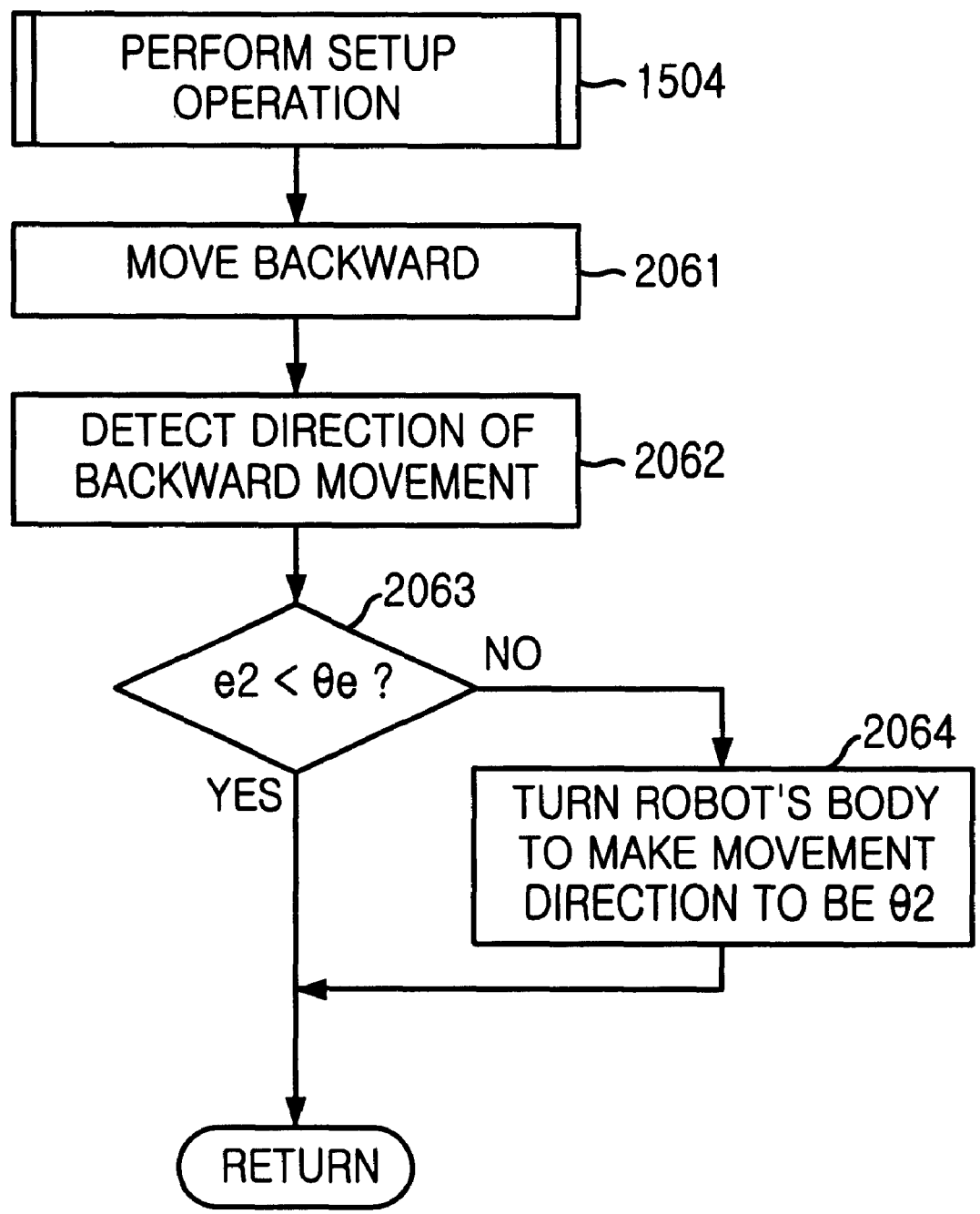
FIG. 20 is a flow chart illustrating sequential steps of a setup operation in FIG. 15 in accordance with another embodiment of the present invention.

FIG. 20 is a flow chart illustrating sequential steps of the setup operation in FIG. 15 when the robot moves backward.

Referring to FIG. 20, at step 2061, the robot moves backward by rotating the left and the right motors in a backward direction by a predetermined number. At step 2062, a robot's movement direction is detected through the electronic compass, in order to correct a deviated direction due to a collision with the ground or obstacles.

At step 2063, whether an error value e2 corresponding to a difference between a detected backward direction $\alpha 2$ and an original backward direction $\theta_2$ is smaller than a predetermined minimum direction error value $\theta_e$ is determined. If the error value e2 is smaller than the minimum direction error value $\theta_e$, an operation for correction the robot's body in the backward movement is finished.

At step 2064, if it is determined at the step 2063 that the error value e2 is not smaller than the minimum direction error value $\theta_e$, the robot's body is rotated to thereby be in the original backward direction $\theta_2$.

Figure 21:
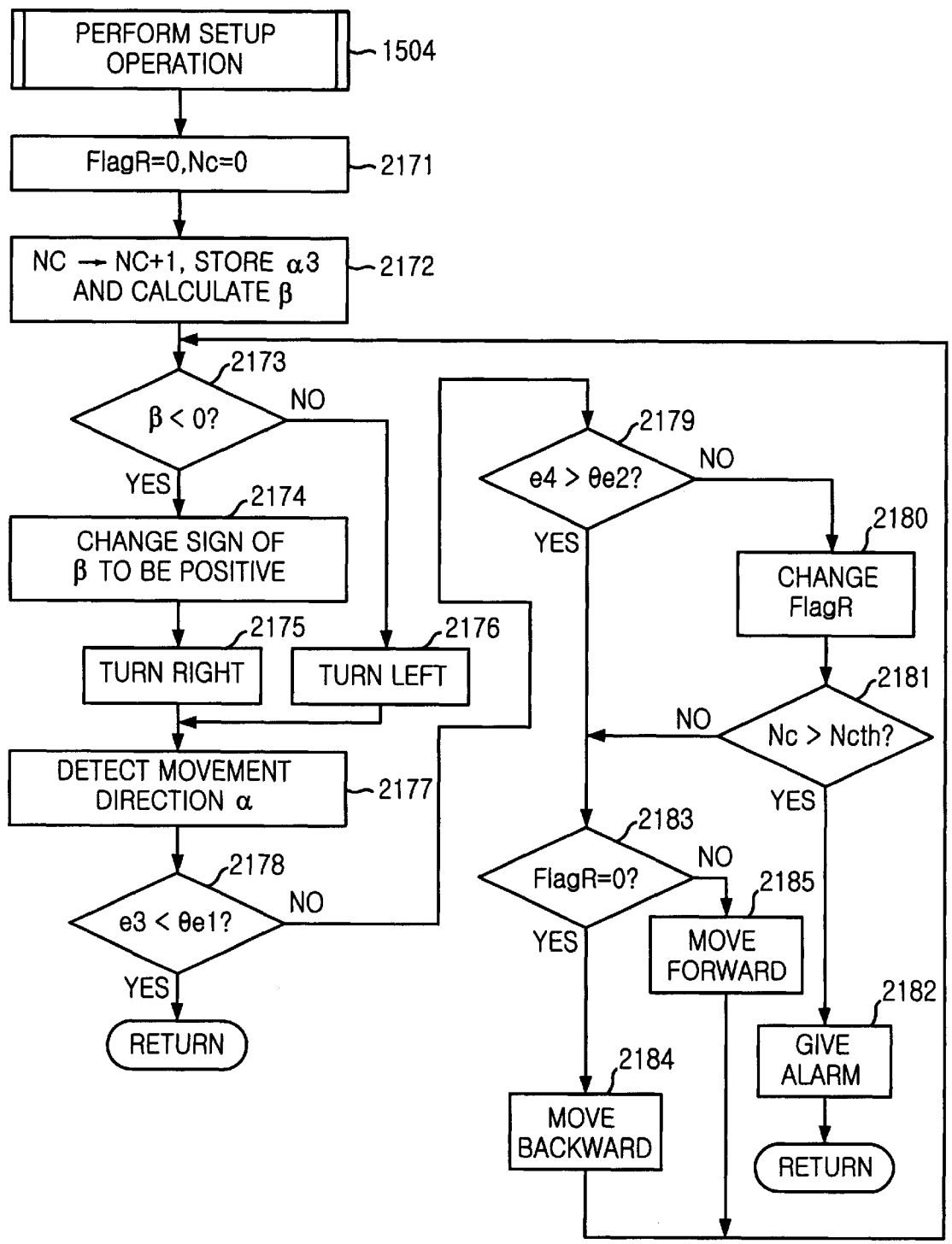
FIG. 21 is a flow chart illustrating sequential steps of a setup operation in FIG. 15 in accordance with further another embodiment of the present invention.

FIG. 21 is a flow chart illustrating sequential steps of the setup operations in FIG. 15 in a rotation of the robot's body according to another embodiment of the present invention.

The operation of the rotation of the robot's body represents a direction change from a current movement direction $\alpha 3$ to a target direction $\theta_3$. When it is difficult for the robot to rotate since the robot collides with the obstacles, the robot can change the direction by moving forward/backward little by little.

Referring to FIG. 21, at step 2171, an initial value of a forward/backward direction value FlagR is set to '0', and the number of a correction operation is set to '0'.

At step 2172, after increasing the number of the correction operation one by one, a detected current direction of the robot is stored and an angle difference β of the robot's body direction is subtracted from the target direction. At step 2173, whether the angle difference β is smaller than '0' is determined. At step 2174, if the angle difference β is a negative (−) value, i.e., smaller than '0', a sign of the angle difference β is converted into a positive sign (+). At step 2175, the left and the right motors are rotated in a forward and a backward direction by the angle difference β, respectively, to thereby turn right the robot's body.

At step 2176, if the angle difference β is a positive (+) value, i.e., greater than '0', the left and the right motors are rotated in a backward and a forward direction by the angle difference β, respectively, to thereby turn left the robot's body.

At step 2177, in order to correct a turned direction of the robot, a current direction α of the robot is detected through the electronic compass 120. At step 2178, whether a difference e3 between a detected direction α and the target direction θ3 is smaller than a predetermined minimum direction error value $\theta_{e1}$ is determined. If the difference e3 is smaller than the minimum direction error value $\theta_{e1}$, an operation for rotating the robot's body is finished.

At step 2179, if it is determined at the step 2178 that the difference e3 is not smaller than the minimum direction error value $\theta_{e1}$, whether a difference e4 between a previous direction α3 of the robot and the detected current direction α is greater than a predetermined minimum direction error value $\theta_{e2}$ is determined. At step 2180, if the difference e4 is not greater than the predetermined minimum direction error value $\theta_{e2}$, and if the forward/backward direction value FlagR is '1', the forward/backward direction value FlagR is changed into '0'. Also, if the forward/backward direction value FlagR is '0', the forward/backward direction value FlagR is changed into '1'. As a result, the forward and the backward direction are changed.

At step 2181, whether the number Nc of the correction operation is greater than a predetermined reference number Ncth of the correction operation is determined. At step 2182, if the number Nc of the correction operation is greater than a predetermined reference number Ncth of the correction operation, an alarm is given and an operation is finished. In that case, the robot periodically gives a 'beep' sound in order to inform a user that there is no change of the direction.

At step 2183, if it is determined at the step 2179 that the difference e4 is greater than the minimum direction error value $\theta_{e2}$, whether the forward/backward direction value FlagR is set to '0' is determined. At step 2184, if the forward/backward direction value FlagR is set to '0', the robot moves backward by a predetermined minimum distance. Then, the step 2173 for determining the magnitude or the angle difference β is repeated.

If it is determined at the step 2181 that the number Nc of the correction operation is not greater than the reference number Ncth of the correction operation, the step 2183 for determining the forward/backward direction value FlagR is repeated.

Figure 22:
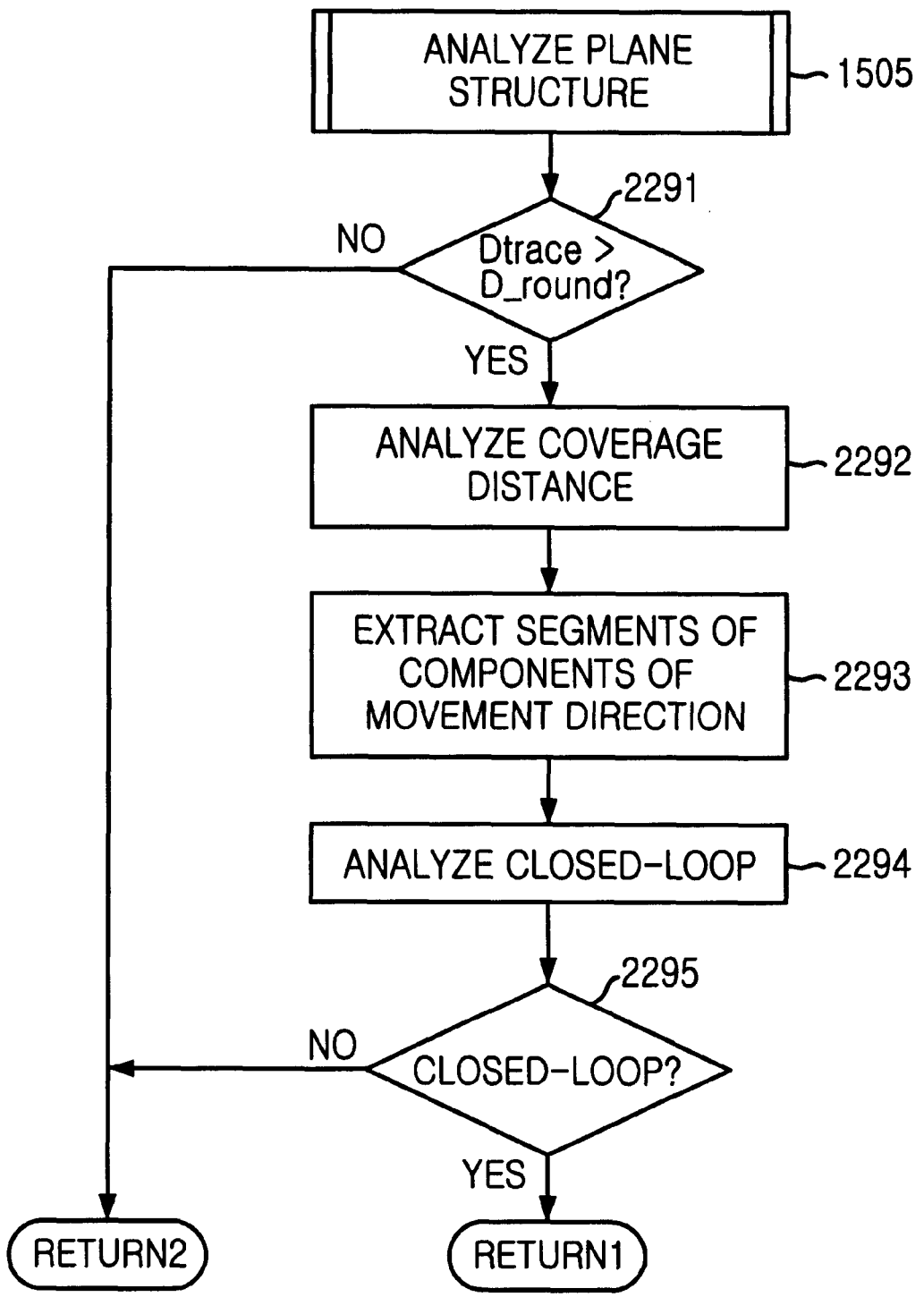
FIG. 22 is a flow chart illustrating sequential steps of analyzing a plane structure in FIG. 15.

FIG. 22 is a flow chart illustrating sequential steps of the plane structure analysis for analyzing whether the plane structure is a closed-loop or not.

Referring to FIG. 22, at step 2291, whether a movement distance Dtrace from the initial operation is greater than a predetermined minimum distance D_round. At step 2292, if the movement distance Dtrace is greater than the minimum distance D_round, a coverage distance of the robot is analyzed. At this time, the coverage distance within a predetermined space and data having a direction are processed by considering the movement distance as a locus of a contour trace.

If it is determined at the step 2291 that the movement distance Dtrace is not greater than the predetermined minimum distance D_round, the step for the plane structure analysis is finished.

At step 2293, segments of movement direction components is extracted. That is, the segments are extracted by offsetting opposite components, to thereby obtain one long segment having a constant direction.

At step 2294, by continuously adding angles between a next segment and an extracted segment, a closed-loop analysis is performed at a point when the added angle becomes 360°.

At step 2295, since a reliability of the closed-loop analysis is very high when a longest segment is repeated two times, whether concurrence of a length and a direction with respect to the longest segment are analyzed. If there is a concurrence, whether or not the plane structure is a closed-loop having the added angle being 360° is determined.

If it is determined at the step 2295 that the plane structure is the closed-loop, the plane structure analysis is completed.

If it is determined at the step 2249 tat the plane structure is not the closed-loop, the plane structure analysis is finished.

FIG. 23 is a diagram illustrating a procedure of the plane structure analysis.

Referring to FIG. 23, in case of 23(A) which has a direction difference components of 180°, these components are offset and replaced with a component having a constant direction, shown in FIG. 23(C).

In case of 23(B), a triangle-shaped component having 45° and −45° is offset, and a behind component is also offset, thereby being replaced with a component having a constant direction, shown in FIG. 23(C).

Meanwhile, according to the right-side priority mode such as FIGS. 23(D) and 23(D) and the left-side priority mode such as FIGS. 23(F) and 23 (G), respective angle shave an opposite direction.

That is, in case of the right-side priority, since the robot moves along the wall disposed at the right side, the angle has a positive (+) sign in moving counterclockwise. On the contrary, in case of the left-side priority, the angle has a positive (+) sign in moving clockwise.

The step for preventing the robot from moving on around a specific object in FIG. 15 will be described in detail.

Unlike a movement at space of a plane structure, when the robot is continuously rotating around the specific object, the angle between the movement directions is a negative (−) sign. Therefore, if the added angle of the segments is below −360°, it is determined that the robot is continuously rotating around the specific object. In that case, in order to escape that looping, when moving in a predetermined direction, the robot is turned as much as 90° and then moves forward until the front distance becomes the reference near distance Near. Then, an entire system is made to be an initial status and restarted.

As described above, after the plane structure analysis, if there is a place of the sound source on the plane structure, the robot moving to the place of the sound source, and if there is an error on the analyzed data in finding the place of the sound source or the robot does not dock to the charger, the charger having a sound signal generator is allowed to give a sound signal periodically under a control of the remote control unit 122, thereby making it possible for the robot to find the place of the charger.

Figure 24:
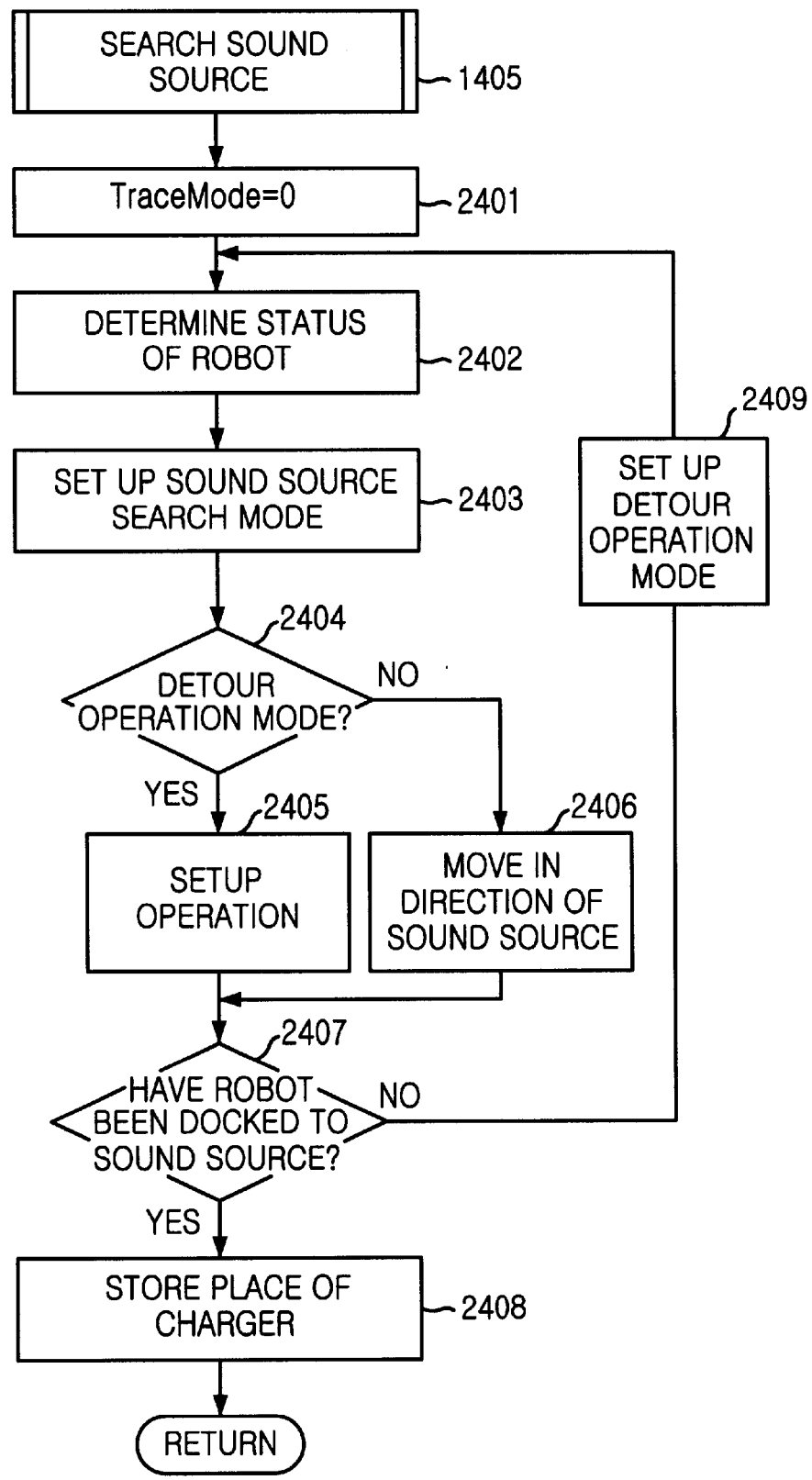
FIG. 24 is a flow chart illustrating sequential steps of searching a sound source.

FIG. 24 is a flow chart illustrating sequential steps of searching the place of the sound source.

Referring to FIG. 24, at step 2401, an initial value of a movement mode TraceMode for moving in a direction of the sound source is set to '0'. At step 2402, a movement direction and distances between the robot's body and the walls disposed at the front, the left side and the right side are detected, and a current status of the robot is determined by using the detected distance and direction.

At step 2403, after determining the current status of the robot, an operation for searching the position of the sound source is set.

At step 2404, whether a current status is a detour operation mode. At step 2405, if it is determined as the detour operation mode, a setup operation is performed. At step 2406, if not the detour operation mode, the robot moves in a direction of the sound source.

At step 2407, whether the robot docks the sound source or not is determined. At step 2408, if it is determined that the robot docks the charger having the sound source, the battery is charged for a predetermined time, and the place of the charger is stored in the RAM 129.

At step 2409, if it is determined that the robot does not dock the charger, the detour operation mode for detouring an obstacle disposed in a direction of the sound source is set and then the step 2402 is repeated. At this time, as one method for detouring the obstacle when the robot collides with the obstacle, the detour operation models set, to thereby make the robot to move along the right-side wall or the left-side wall.

Figure 25:
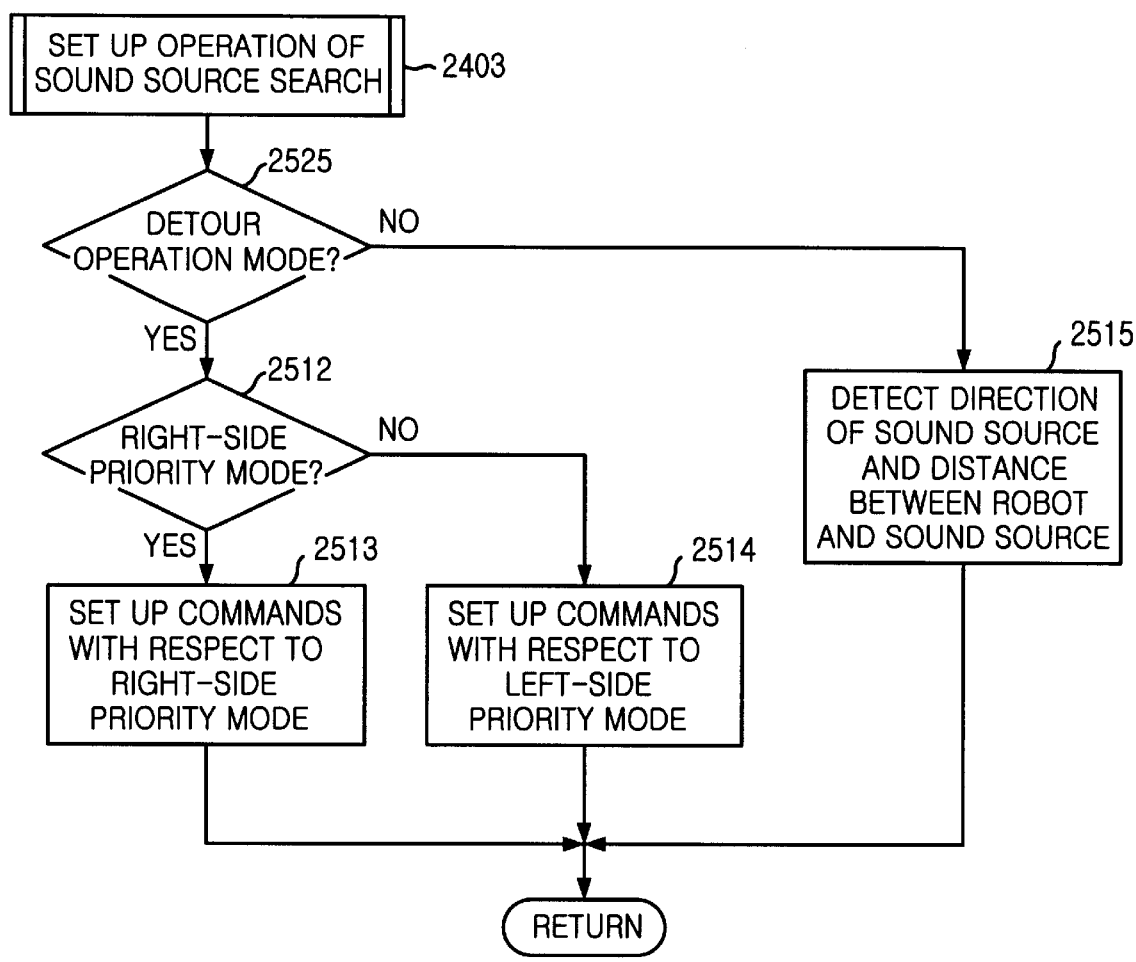
FIG. 25 is a flow chart illustrating sequential steps of setting an operation of a search for a sound source.

FIG. 25 is a flow chart illustrating sequential steps of the sound source search.

Referring to FIG. 25, at step 2511, whether a current status is the detour operation mode or not is checked. At step 2512, if the current status is the detour operation mode, whether the right-side priority mode is or not is determined. At step 2513, if it is determined as the right-side priority mode, commands with respect to the right-side priority mode is set up.

At step 2514, if it is determined at the step 2512 that it is not the right-side priority mode, commands with respect to the left-side priority mode is set up.

At step 2515, if it is determined at the step 2511 that it is not the detour operation mode, a direction of the sound source and a distance between the robot's body and the sound source are detected.

Figure 26:
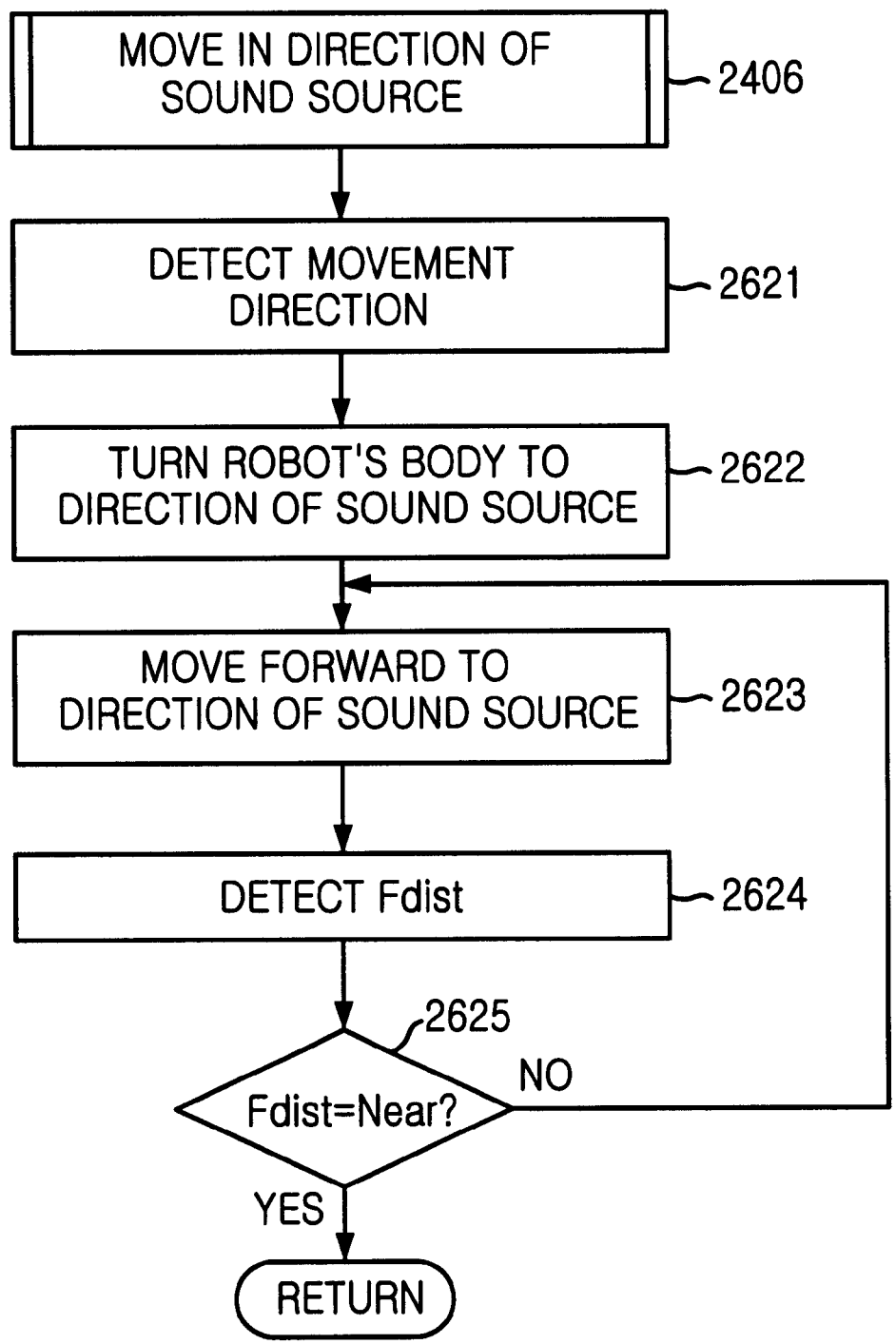
FIG. 26 is a flow chart illustrating sequential steps of moving to a direction of sound source in FIG. 24.

FIG. 26 is a flow chart illustrating sequential steps of the movement to the sound source.

Referring to FIG. 26, at step 2621, a movement direction of the robot is detected by using the electronic compass 120. At step 2622, the robot's body is turned to a direction of the sound source according to the detected movement direction. At step 2623, the robot moves forward to the direction by a predetermined minimum distance.

At step 2624, a front distance Fdist between the robot and the sound source is detected in order to sense the sound source or the obstacle. At step 2625, whether the detected front distance Fdist is equal to the reference near distance Near or not is determined. If the detected front distance Fdist is equal to the reference near distance Near, a forward movement is stopped.

Meanwhile, if it is determined at the step 2625 that the front distance Fdist is not equal to the reference near distance Near, the step 2624 for moving forward to the sound source is performed.

Figure 27:
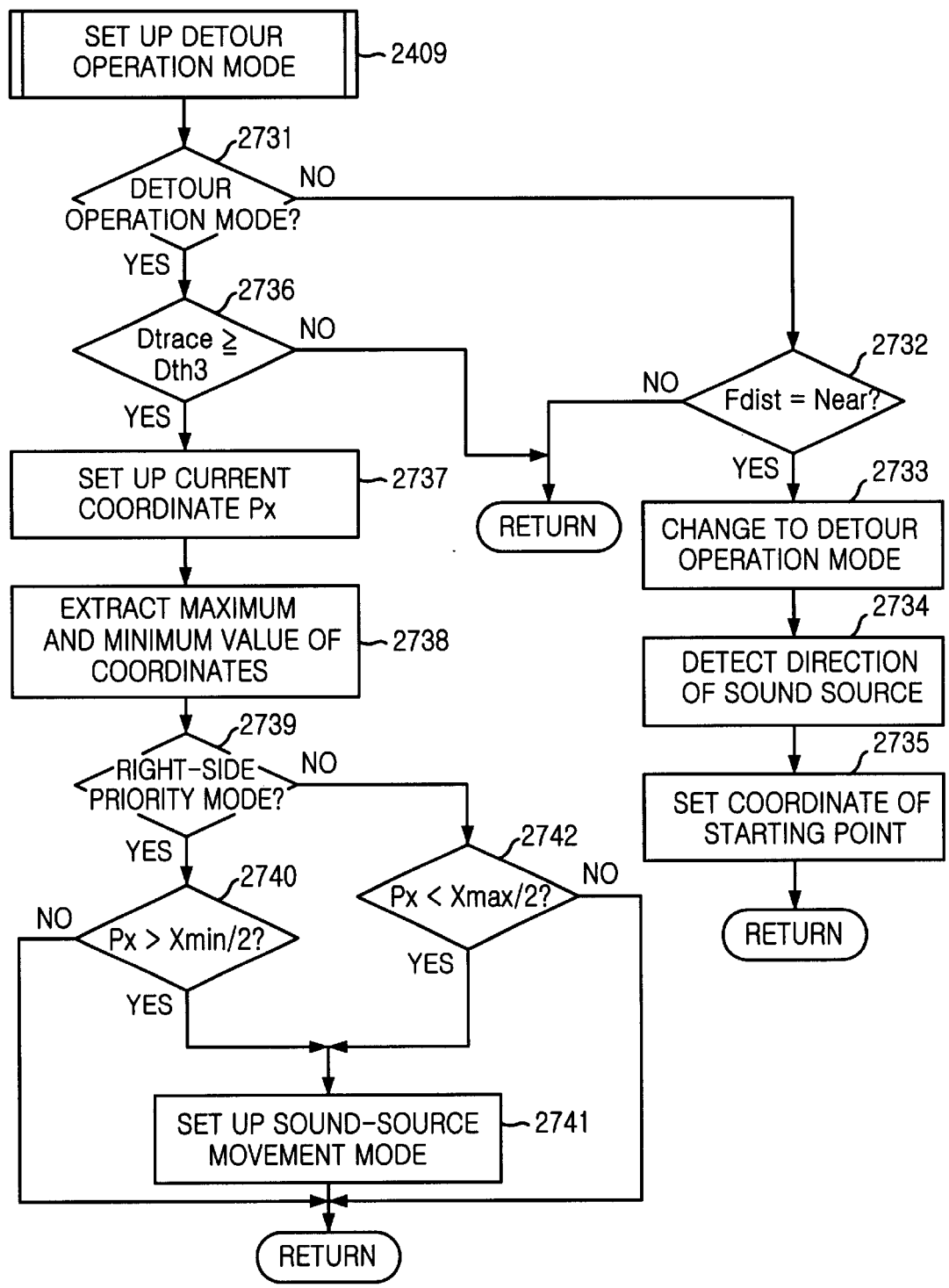
FIG. 27 is a flow chart illustrating sequential steps of setting a detour operation mode in FIG. 24.

FIG. 27 is a flow chart illustrating sequential steps of the detour operation mode.

Referring to FIG. 27, at step 2731, whether the current mode of the robot is the detour operation mode or not is determined.

At step 2732, if the current mode is not the detour operation mode, whether the detected front distance Fdist is equal to the reference near distance Near or not is determined. If not equal, the operation mode is finished.

If the front distance Fdist is equal to the reference near distance Near, it is determined that there is an obstacle in a front direction and an initialization of the detour operation is performed as follows. At step 2733, after changing the operation mode into the detour operation mode, a maximum value and a minimum coordinate value of X axis are initialized to '0', respectively. At step 2734, the direction of the sound source is detected. At step 2735, after setting the detected direction of the sound source as a coordinate of Y axis, a current position of the robot is set to (0,0) as a starting point.

At step 2736, if it is determined at the step 2731 that it is the detour operation mode, whether the distance Dtrace moving during the detour operation mode is equal to or greater than the predetermined minimum reference distance Dth3 is determined. If the distance Dtrace is not equal to or greater than the minimum reference distance Dth3, the operation is stopped without setting the operation mode.

At step 2737, if it is determined that the distance Dtrace is greater than the minimum reference distance, a coordinate component of X axis is added to a previous coordinate component of X axis, to thereby set a current coordinate Px. Here, the coordinate component of X axis is set according to the direction and the distance moved from the previous status to the current status. At this time, the coordinate component of X axis is set by performing the step 2735.

At step 2738, if the current coordinate Px is smaller than a minimum value of the X axis, the minimum value is extracted as a minimum coordinate value Xmin of the current coordinate Px. If the current coordinate Px is greater than the maximum value of the X axis, the maximum value is extracted as a maximum coordinate value Xmax of the current coordinate Px.

At step 2739, whether the operation mode is the right-side priority mode or the left-side priority mode is determined by using the maximum and the minimum coordinate values Xmax and Xmin. At step 2740, if it is the right-side priority mode, whether the value of the current coordinate Px is greater than half the minimum value Xmin/2 or not is determined. At step 2741, if the value of the current coordinate Px is greater than half the minimum value Xmin/2. the operation for moving to the direction of the sound source is set.

If it is determined at the step 2740 that the value of the current coordinate Px is not greater than half the minimum value Xmin/2, the step of the detour operation mode is performed.

At step 2742, if it is determined at the step 2739 that the operation mode is the right-side priority mode, whether the value of the current coordinate Px is smaller than half the maximum value Xmax/2 or not is determined. If the value of the current coordinate Px is smaller than half the maximum value Xmax/2, the step 2741 of moving to the direction of the sound source is performed. At this time, in case of the left-side priority mode, when the current coordinate Px is a component increasing in the direction of X axis, the detour operation mode is escaped. In case of the right-side priority mode, the detour operation mode is escaped at a point when the current coordinate Px is decreased in the direction of X axis.

However, if the value of the current coordinate Px is not greater than the half the maximum value Xmax, the detour operation mode is maintained.

Figure 28:
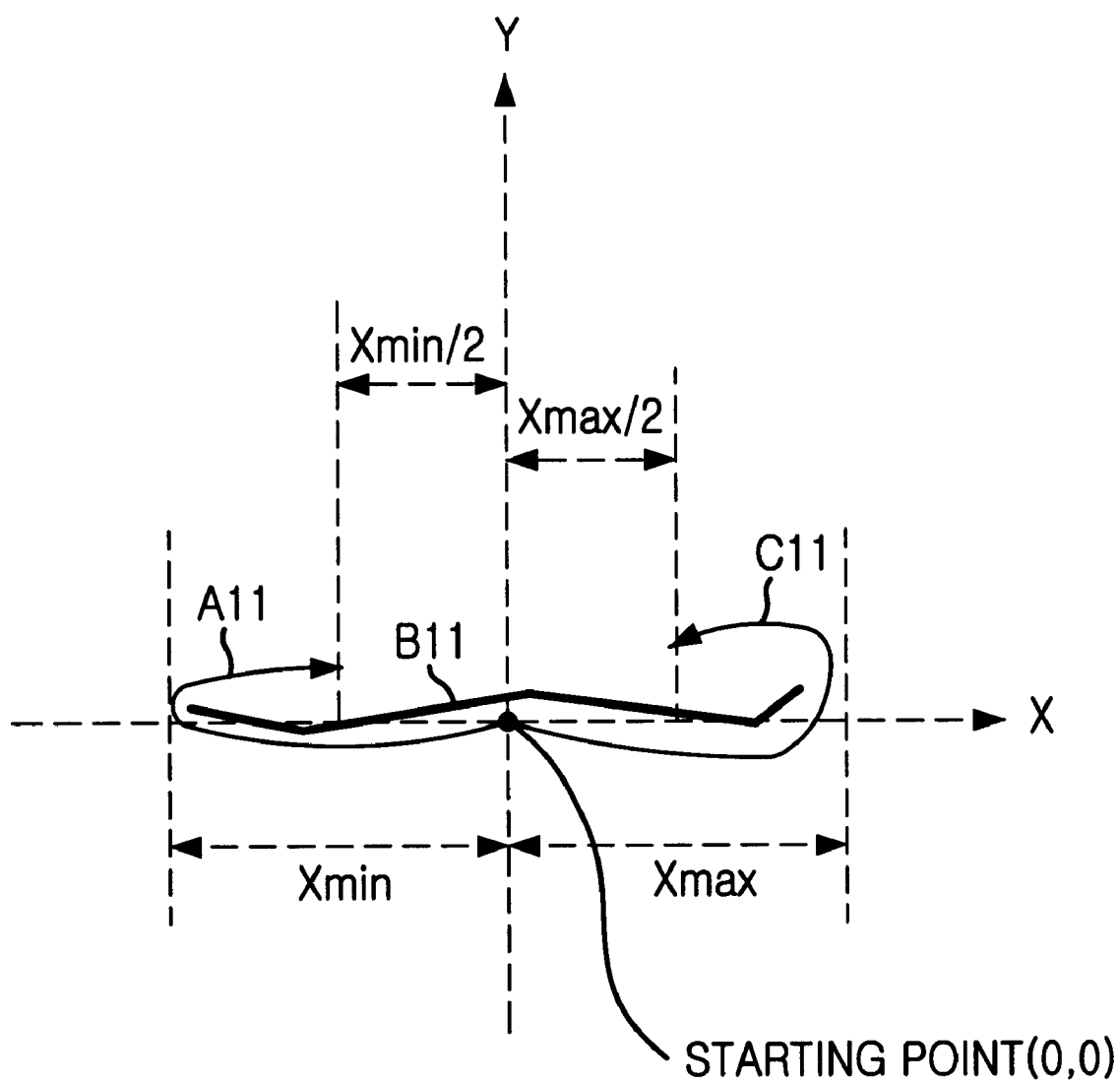
FIG. 28 is a diagram explaining a detour operation mode.

FIG. 28 is a diagram explaining the detour operation. A reference numeral B11 represents an obstacle, C11 a locus of the movement distance with respect to the right-side priority mode, and A11 a locus of the movement distance with respect to the left-side priority mode, respectively.

Referring to FIG. 28, in case of the locus with respect to the right-side priority mode, the minimum value Xmin is updated moving the robot to the left side, and the detour operation mode is completed at a point when the current coordinate Px is smaller than half the maximum value Xmax, i.e., Xmax/2, by again moving to the left side.

Generally, a sensor for a human body, such as a superconductive-type sensor, senses a human body by detecting a wavelength of an infrared ray, generated at a body temperature. The sensor detects only human body, and does not detect a deviation of temperature in the environment and noise.

Figure 29:
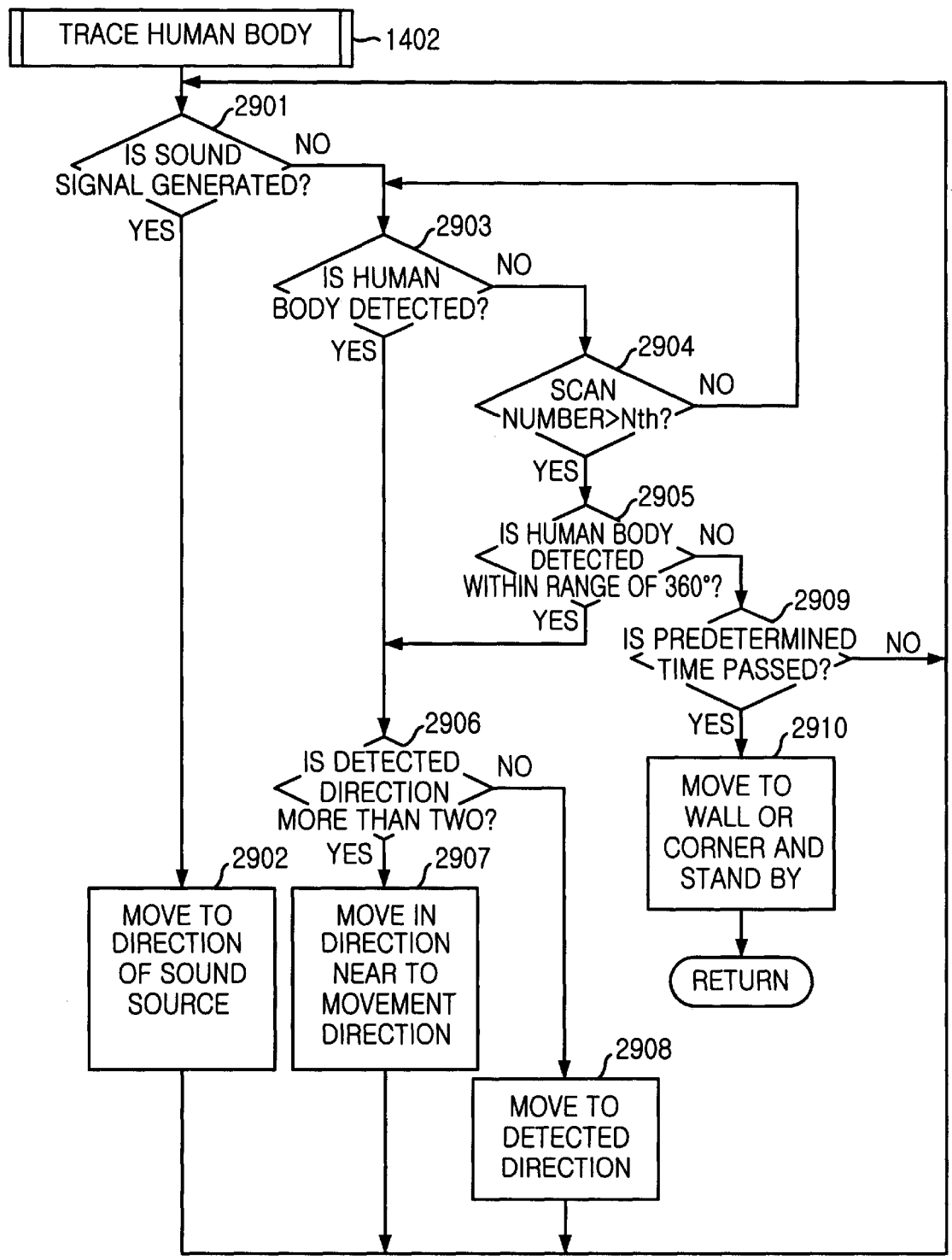
FIG. 29 is a flow chart illustrating sequential steps of tracing a human body under a standby mode in FIG. 14.

FIG. 29 is a flow chart illustrating sequential steps of tracing human body in FIG. 14.

Referring to FIG. 29, at step 2901, whether the sound signal generated from the sound signal generator is detected or not is determined. This is because the robot is allowed to preferentially move to a human body having the sound signal generator. At step 2902, if the sound signal is detected, the robot is moved to the sound source that generates the sound signal. At step 2903, if it is determined at the step 2901 that the sound signal is not detected, the robot detects the human body by rotating by 60° in the left/right direction. Whether the human body is detected within a range of 120° or not is determined. At step 2904, if the human body is not detected, whether the scan number, performed to detect the human body is checked, is greater than a predetermined reference scan number, e.g., 2 and 3, is determined. At step 2905, if the scan number is greater than the reference scan number, whether the human body is detected within a range of 360° or not is determined.

At step 2906, if it Ls determined at the step 2905 that the human body is detected, whether the direction of the detected human body is more than two is determined. At step 2907, if the direction is more than two, a direction considered as a nearest to a previous trace direction is selected and the robot moves to the selected direction.

At step 2908, if it is determined at the step 2906 that the direction is only one, the robot moves to the detected direction.

At step 2909, if the human body is not detected at the step 2905, whether a predetermined time is passed after an operation for detecting the human body is determined. At step 2910, if the predetermined time is passed, the robot moves to a wall or a corner and then maintains a standby status.

However, if it is determined at the step 2909 the predetermined time is not passed, the step 2901 for detecting the sound signal is performed.

Meanwhile, if it is determined at the step 2903 that the human body is not detected, the step 2906 is performed.

FIG. 30 is a flow chart illustrating a guard operation mode.

Referring to FIG. 30, at step 3001, after a predetermined time is passed from transfer of commands for instructing the guard operation mode, the guard operation is started.

At step 3002, the front distance Fdist1, the left-side distance Ldist1 and the right-side distance Rdist1 are detected.

At step 3003, the front distance Fdist1, the left-side distance Ldist1, and the right-side distance Rdist1 are stored in the RAM 129. At step 3004, a next front distance Fdist2, a next left-side distance Ldist2 and a next right-side distance Rdist2 are detected.

At step 3005, whether there is any change or not is determined by comparing the previous front distance Fdist1, the previous left-side distance Ldist1 and the previous right-side distance Rdist1 with the current front distance Fdist2, the current left-side distance Ldist2 and the current right-side distance Rdist2, respectively.

At step 3006, if there is no change, a first alarm is set. At step 3007, a voice data is analyzed in order for identification.

At step 3008, whether the analyzed voice data is a registered voice or not is determined. If the analyzed voice data is the registered voice, the step 1304 is repeated after a delay of a predetermined time.

At step 3009, if the analyzed voice data is not the registered voice, the alarm is given and the step 3007 is then performed.

If it is determined at the step 3005 that there is no change and the human body is detected, the step 3006 is repeated.

However, if it is determined that the human body is not detected, the step 3002 of the distance measurement is repeated.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A robot apparatus for detecting a sound signal outputted from a sound signal generating means to move to a position of the sound signal generating means, wherein the sound signal has a specific pattern, the robot apparatus comprising:

at least three sound receiving means for receiving the sound signal outputted from the sound signal generating means;

a phase difference detection means for detecting a phase difference between each sound signals from the sound receiving means;

a processing means for determining a position of the sound generating means using the phase difference, to generate a moving control signal; and a moving means, in response to the moving control signal, for moving the robot apparatus to the position of the sound generating means.

2. The robot apparatus as recited in claim 1, wherein the sound receiving means includes a first, a second and a third receivers, each being disposed in an equilateral triangle form and being arranged to make maximum phase difference of sound signals received through the receivers to be within a half the frequency of the sound signal.

3. The robot apparatus as recited in claim 2, wherein the phase difference detection means includes:
 a first amplifying and filtering unit for amplifying and filtering a first signal outputted from the first receiver;
 a second amplifying and filtering unit for amplifying and filtering a second signal outputted from the second receiver;
 a third amplifying and filtering unit for amplifying and filtering a third signal outputted from the third receiver;
 a sound-pattern detection unit for receiving an output signal of the first amplifying and filtering unit and a clock having a predetermined period and outputting a detection signal in case where a period of the output signal is constant for a predetermined time; and
 a phase detection unit, in response to the detection signal, for receiving output signals of the first, the second and the third amplifying and filtering units to detect phase differences between each output signal, and for outputting detected phase difference and interrupt signal which allows the phase difference data to be outputted to an exterior.

4. The robot apparatus as recited in claim 3, wherein the sound-pattern detection means includes:
 an edge detector for detecting rising and falling edges of the first signal, to output pulse signals;
 a pulse interval counter for receiving the clock and counting intervals between the pulse signals to output count value;
 a setup period determinator for receiving the pulse signals from the edge detector and the count value from the pulse interval counter and determining whether a period of the first signal is constant or not;
 a detection signal generator for receiving the pulse signals and a detection value from the setup period determinator and detecting whether the first signal is continuously inputted at a predetermined period, to output a detection signal; and
 a clear signal generator for receiving the clock and an output signal of the edge detector to clear the detection signal outputted from the detection signal generator.

5. The robot apparatus as recited in claim 4, wherein the edge detector includes:
 a first inverter for inverting the first signal;
 a D flip flop for outputting a signal having a period corresponding to half the period of an output signal of the first inverter;
 a plurality of second inverters, serially coupled to each other, for delaying an output signal of the D flip flop; and
 an exclusive OR (XOR) gate for XORing the output signal of the D flip flop and an output signal of the second inverter.

6. The robot apparatus as recited in claim 5, wherein the pulse interval counter includes:
 a plurality of third inverters, serially coupled to each other, for delaying the output signal of the edge detector;
 a counter for counting an output signal of the third inverters to output count values to a first and a second output terminals in response to a signal inputted to a clock terminal;
 a first AND gate for ANDing signals outputted from the first and the second output terminals of the counter;
 a fourth inverter for inverting an output signal of the first AND gate;
 a second AND gate for ANDing an output signal of the fourth inverter and the clock, to output an output signal to an clock terminal of the counter; and
 a third AND gate for ANDing the output signal of the second output terminal of the counter and the output signal of the fourth inverter.

7. The robot apparatus as recited in claim 6, wherein the setup period determinator includes a first D flip flop having a clock terminal receiving the output signal of the edge detector, an input terminal receiving the output signal of the pulse interval counter, and inverting output terminal and non-inverting output terminal for respectively outputting output signals to the detection signal generator.

8. The robot apparatus as recited in claim 7, wherein the clear signal generator includes:
 a second counter for counting the clock inputted through a clock terminal and outputting output signals through a first and a second output terminals;
 a fourth AND gate for ANDing the output signals outputted from the first and the second output terminals of the second counter, to output an output signal to the clear terminal of the second D flip flop contained in the setup period determinator; and
 an OR gate for ORing the output signal of the fourth AND gate and the output signal of the edge detector, to output an output signal to the clear signal of the second counter.

9. The robot apparatus as recited in claim 8, wherein the detection signal generator includes:
 a third counter for counting a signal inputted through a clock terminal and outputting output signals through a first and a second output terminals, whose clear terminal is coupled to the non-inverting output terminal of the second D flip flop of the setup period determinator;
 a fifth AND gate for ANDing the output signals of the first and the second output terminals of the third counter, to output the detection signal;
 a fourth inverter for inverting an output signal of the fifth AND gate; and
 a sixth AND gate for ANDing an output signal of the non-inverting output terminal of the second D flip flop contained in the setup period determinator, the clock and an output signal of the fourth inverter, to output an output signal to the clock terminal of the third counter.

10. The robot apparatus as recited in claim 3, wherein the phase difference detector includes:
 a clock counting unit for receiving two of the output signals from the first, the second and the third amplifying and filtering means and counting the number of second clocks during rising edges of the two output signals, to output each phase difference data;
 a clear signal generating unit for receiving one signal of the two signals, to generate a clear signal, for clearing the clock counting unit; and
 an interrupt signal generating unit, in response to the detection signal, for generating an interrupt signal for indicating a read timing of each phase difference data.

11. The robot apparatus as recited in claim 10, wherein the clear signal generating unit includes:
 a first D flip flop having a clock terminal receiving one signal of the two signals and an input terminal coupled to a non-inverting terminal of the first D flip flop;
 an inverter for inverting the one signal of the two signal; and
 a first AND gate for ANDing an output signal of the inverter and an output signal of the non-inverting terminal of the D flip flop.

12. The robot apparatus as recited in claim 11, wherein the clock counting unit includes:
   a second D flip flop having an input terminal coupled to a power terminal, a clock terminal coupled to one signal of the two signal, and a clear terminal coupled to the other signal of the two signal;
   a second AND gate for ANDing the second clock, an output signal of the non-inverting output terminal of the second D flip flop, and an output signal of the non-inverting output terminal of the first D flip flop; and
   a counter having a clock terminal coupled to an output terminal of the second AND gate and a clear terminal coupled to an output terminal of the first AND gate of the clear signal generating unit.

13. The robot apparatus as recited in claim 12, wherein the interrupt signal generating unit includes a third AND gate for ANDing one signal of the two signals, an output signal of the non-inverting output terminal of the first D flip flop contained in the clear signal generating unit, and the detection signal, to generate the interrupt signal.

14. The apparatus as recited in claim 1, wherein the sound receiving means includes at least four receivers, each being disposed in an equilateral triangle form.

15. The robot apparatus as recited in claim 1, further comprising a movement-direction detection means, wherein the movement-direction detection means includes an electronic compass for detecting a current movement direction of the robot apparatus by detecting an earth's magnetic field and an analog-to-digital converter for converting an analog value detected from the electronic compass into a digital value.

16. The robot apparatus as recited in claim 15, wherein the electronic compass includes a first magnetic-field detector for detecting a X-direction of the earth's magnetic field and a second magnetic-field detector for detecting a Y-direction of the earth's magnetic field, the first and the second magnetic-field detectors being disposed in parallel to each other, each magnetic-field detector having two hole sensors coupled with ferrites, respectively.

17. The robot apparatus as recited in claim 15, wherein each magnetic-field detector includes:
   a first hole sensor coupled between the power terminal and a ground terminal;
   a second hole sensor coupled between the power terminal and the ground terminal; and
   an amplifier having a non-inverting input terminal coupled to an output terminal of the first hole sensor, an inverting input terminal coupled to an output terminal of the second hole sensor through a first resistor, a second resistor and a capacitor being coupled in parallel between the inverting input terminal and an output terminal, a third resistor being serially coupled between the non-inverting input terminal and the ground terminal.

18. A method for operating a robot apparatus for detecting a sound signal outputted from a sound signal generating means to move to a position of the sound signal generating mean, wherein the sound signal has a specific pattern, the method comprising the steps of:
   a) determining whether an operation mode is set up;
   b) if the operation mode is not set up, setting up a standby mode to sense and trace a human body being within a predetermined distance;
   c) if the operation mode is set up, determining kinds of operation mode; and
   d) according to the operation mode, clearing a predetermined area by using an information of a plane structure obtained by searching and analyzing the plane structure, docking to a charger by searching the charger generating a sound signal when a battery of the robot is discharged, searching a sound source for generating a sound signal and performing a guard operation.

19. The method as recited in claim 18, wherein the step d) includes the steps of:
   d1) if the operation mode is a plane structure search and analysis mode, searching and analyzing the plane structure by detecting a left, a right and a front distance;
   d2) if the operation mode is a sound source search mode, search a sound direction to move to a sound direction, and searching and docking to the charger to charge the battery;
   d3) if the operation mode is a guard operation mode, performing a guard operation after passing a predetermined time when an operation command is transmitted; and
   d4) if the operation mode is an automatic clearing mode, clearing a predetermined area according to the information of the plane structure obtained through search and analysis of the plane structure.

20. The method as recited in claim 19, wherein the step d1) includes the steps of:
   d11) performing an initial operation to search and move to a near wall, calculating a left, a right, and a front distance;
   d12) after performing the initial operation, detecting a distance between a robot's body and a left, a right, and a front distance, and a movement direction, to determine a current status of the robot apparatus by using an information associated with a detected distance and movement direction;
   d13) setting up an operation by using a determined current status and a previous status;
   d14) performing an operation which is set up at the step d13), and correcting a movement direction if the robot apparatus moves to an undesired direction; and
   d15) after correcting the movement direction, according to whether or not the plane structure is a closed-loop by using a coverage distance and direction, preventing the robot apparatus from continuously moving around a specific object and repeating the step d12).

21. The method as recited in claim 20, wherein the step d15) includes the steps of:
   d151) analyzing whether or not the plane structure to be searched is the closed-loop by using the coverage distance and direction;
   d152) if it is determined that the plane structure is not the closed-loop, preventing the robot apparatus from continuously moving around the specific object; and
   d153) if it is determined that the plane structure is the closed-loop, finishing an operation of the plane structure search and analysis.

22. The method as recited in claim 20, wherein the step d12) includes the steps of:
   d121) detecting a front distance between the robot's body and a wall disposed at a current movement direction;
   d122) detecting a left distance between the robot's body and the current movement direction;
   d123) detecting a right distance between the robot's body and a current movement direction;
   d124) detecting a current movement direction to obtain an information used to change the robot's movement status;

d125) determining a current movement distance status by using a detected front distance;

d126) determining a current movement distance status by using a detected left distance; and d127) determining a current movement distance status by using a detected right distance.

23. The method as recited in claim 22, wherein each of the steps d125) to d127) includes the steps of:

d1251) determining whether or not the detected distance is smaller than a predetermined first reference distance;

d1252) if the detected distance is smaller than the predetermined first reference distance, determining the detected distance as a first near distance status;

d1253) if the detected distance is not smaller than the predetermined first reference distance, determining whether or not the detected distance is smaller than a predetermined second reference distance;

d1254) if the detected distance is equal to or larger than the predetermined first reference distance and smaller than the predetermined second reference distance, determining the detected distance as a second near distance status;

d1255) if the detected distance is equal to or larger than the predetermined first reference distance and not smaller than the predetermined second reference distance, determining whether or not the detected distance is equal to or larger than the predetermined second distance and smaller than a predetermined third reference distance;

d1256) if the detected distance is equal to or larger than the predetermined second reference distance and smaller than the predetermined third reference distance, determining the detected distance as a third near distance status; and d1257) if the detected distance is equal to or larger than the predetermined second reference distance and not smaller than the predetermined third reference distance, determining the detected distance as a far distance status.

24. The method as recited in claim 20, wherein the step d14) includes the steps of:

d141) moving forward the robot apparatus by rotating a left motor and a right motor by a predetermined number in a forward direction, wherein the left and the right motors determine a moving speed and a direction of the robot apparatus;

d142) detecting a forward direction of the robot's body by using the electronic compass mounted to the robot apparatus, to correct a movement direction when the robot apparatus collides with a ground and a obstacle; and d143) determining whether an error value between the detected forward direction value at the step d142) and an original forward direction value is smaller than a predetermined minimum direction error value, to rotate the robot's body to have the forward direction value equal to the original forward direction value.

25. The method as recited in claim 24, wherein the step d143) includes the steps of:

d1431) determining whether the error value between the detected forward direction value at the step d142) and the original direction forward direction value is smaller than the minimum direction error value;

d1432) if the error value is not smaller than the minimum direction error value at the step d1431), rotating the robot's body to have the forward direction value to the original forward direction value; and d1433) if the error value is smaller than the minimum direction error value at the step d1431), finishing a step of correcting the robot's direction when the robot apparatus moves forward.

26. The method as recited in claim 20, wherein the step d14) includes the steps of:

d141) moving backward the robot apparatus by rotating a left motor and a right motor by a predetermined number in a backward direction, wherein the left and the right motors determine a moving speed and a direction of the robot apparatus;

d142) detecting a backward direction of the robot's body to correct a movement direction when the robot apparatus collides with a ground and a obstacle; and d143) determining whether an error value between a detected backward direction value at the step d142) and an original backward direction value is smaller than a predetermined minimum direction error value, to rotate the robot's body to have the backward direction value equal to the original backward direction value.

27. The method as recited in claim 26, wherein the step d143) includes the steps of:

d1431) determining whether the error value between the detected backward direction value at the step d142) and the original direction backward direction value is smaller than the minimum direction error value;

d1432) if the error value is not smaller than the minimum direction error value at the step d1431), rotating the robot's body to have the backward direction value equal to the original backward direction value; and d1433) if the error value is smaller than the minimum direction error value at the step d1431), finishing a step of correcting the robot's direction in a backward movement.

28. The method as recited in claim 20, wherein the step d14) includes the steps of:

d141) setting up an initial value of a forward/backward direction to '0', and setting up the number of correction to '0';

d142) increasing the number of correction one by one, detecting a current direction of the robot's body to store a detected value of the current direction of the robot's body, and calculating an angle difference between a target direction and the detected value of the current direction of the robot's body;

d143) according as whether the angle difference is smaller than '0', turning left or right the current movement direction;

d144) detecting the current direction of the robot's body by using the electronic compass mounted to the robot apparatus, to correct an error of a turned direction of the robot's body;

d145) according as whether a difference between a detected movement direction of the robot's body and a target direction is smaller than a predetermined minimum-direction error value, calculating a difference between a stored previous movement direction of the robot's body and a detected current movement direction, and determining whether or not a calculated difference is greater than the predetermined minimum-direction error value;

d146) if the calculated difference is greater than the predetermined minimum-direction error value, moving backward or forward to a predetermined minimum distance according as whether the forward/backward direction value is set to '0'; and d147) if the calculated difference is nor greater than the minimum-direction error value, changing the forward/backward direction value, and giving an alarm depending on whether the number of correction is greater than a predetermined reference number of correction.

29. The method as recited in claim 28, wherein the step d143) includes the steps of:
- d1431) determining whether the calculated angle difference is smaller than '0';
- d1432) if the calculated angle difference is smaller than '0', changing the angle difference to a positive value greater than '0';
- d1433) turning right the robot's body by rotating the left motor in a forward direction by the angle difference and rotating the right motor in a reverse direction by the angle difference; and
- d1434) if the calculated angle difference is not smaller than '0', turning left the robot's body by rotating the left motor in a reverse direction by the angle difference and rotating the right motor in a forward direction by the angle difference.

30. The method as recited in claim 29, wherein the step d2) includes the steps of:
- d21) setting an initial value of a negative-direction movement mode to '0';
- d22) detecting a movement direction and distances between the robot's body and walls disposed at a left, right and front side, and determining a current status of the robot apparatus by using information on a detected distance and a movement direction;
- d23) setting a sound-source search operation for searching a sound source according to a sound source search mode;
- d24) according to a detour mode, performing a setup operation or moving to a direction of the sound source; and
- d25) performing a battery charge for a predetermined time or setting a detour mode for detouring an obstacle disposed in a direction of the sound source, depending on a robot's docking to the sound source.

31. The method as recited in claim 30, wherein the step d23) includes the steps of:
- d231) determining whether the current movement status of the robot apparatus is the detour mode;
- d232) if the current movement status is the detour mode, setting up commands with respect to a right-side priority mode for moving along a right-side wall and a left-side priority mode for moving along a left-side wall, respectively; and
- d233) if the current movement status is not the detour mode, detecting a sound direction and a distance between the robot's body and the sound source.

32. The method as recited in claim 31, wherein the step d232) includes the steps of:
- d2321) determining whether the current status is the right-side priority mode or the left-side priority mode;
- d2322) if the current status is the right-side priority mode, setting commands according to the right-side priority mode; and
- d2323) if the current status is the left-side priority mode, setting commands according to the left-side priority mode.

33. The method as recited in claim 30, wherein the step d24) includes the steps of:
- d241) determining whether the current status is the detour operation mode;
- d242) if the current status is the detour operation mode, performing a setup operation;
- d243) if the current status is not the detour mode, detecting a movement direction of the robot's body by using the electronic compass;
- d244) rotating the robot's body to a direction of the sound source according to a detected movement direction of the robot's body;
- d245) moving forward in a direction of the sound source by a predetermined minimum distance; and
- d246) if a distance between the robot's body and the sound source is a near distance, stopping an operation of a forward movement to sense the sound source or obstacles disposed at a front side.

34. The method as recited in claim 33, wherein the step d246) includes the steps of:
- d2461) after moving until a distance between a current position and the sound source becomes a minimum distance, detecting a front distance from the current position of the robot's body;
- d2462) determining whether the detected front distance is equal to the distance status;
- d2463) if the detected front distance is equal to the distance status, stopping a forward movement of the robot apparatus; and
- d2464) if the detected front distance is not equal to the distance status, repeating the step d245).

35. The method as recited in claim 34, wherein the step d25) includes the steps of:
- d251) performing a sound source search and determining whether the robot apparatus is docked to the sound source;
- d252) if it is determined that the robot apparatus is docked to the sound source, performing a battery charge for a predetermined time and detecting a current position of the sound source and storing a detected position of the sound source; and
- d253) if it is determined that the robot apparatus is not docked to the sound source, setting a detour mode for detouring an obstacle disposed in a direction of the sound source, and repeating the step d2).

36. The method as recited in claim 35, wherein the step d251) includes the steps of:
- d2511) determining whether the operation mode of the robot apparatus is the detour mode;
- d2512) if it is determined that the operation mode is not the detour mode, performing an initialization of a detour operation, depending on whether the detected front distance is the near distance;
- d2513) if it is determined that the operation mode is the detour mode, setting a current coordinate by adding a X coordinate of X and a previous X coordinate, depending on whether the movement distance of the robot apparatus is equal to or greater than a predetermined reference minimum distance required for a detour operation analysis;
- d2514) if the current coordinate is smaller than a minimum value of X components, extracting the minimum value as a minimum coordinate of the current coordinate, and if the current coordinate is greater than a maximum value of X components, extracting the maximum value as a maximum coordinate of the current coordinate;

d2515) determining whether a current status of the robot apparatus is the right-side priority mode or the left-side priority mode by using an extracted minimum and the maximum values of the current coordinate;

d2516) if it is determined that the current status is the right-side priority mode, setting the sound-direction movement mode depending on whether a value of the current coordinate i s greater than a value corresponding to a half the minimum value of X axis; and d2517) if it is determined that the current status is the left-side priority mode, setting the sound-direction movement mode depending on whether a value of the current coordinate is smaller than a value corresponding to a half the maximum value of X axis.

37. The method as recited in claim 36, wherein the step d2512) includes the steps of:

d25121) determining whether the detected front distance is equal to a distance between the robot apparatus and the sound source;

d25122) if it is determined that the detected front distance is equal to the distance between the robot's body and the sound source, changing to a detour operation mode, and initializing a maximum and a minimum value of the X coordinate to '0';

d25123) detecting the sound direction;

d25124) setting the detected sound direction as a coordinate of Y axis and a current position of the robot as a starting point; and d25125) if it is determined that the detected front distance is not equal to the distance to the sound source, keeping on the sound direction movement mode and finishing the detour operation.

38. The method as recited in claim 36, wherein the step d2513) includes the steps of:

d25131) determining whether the movement distance of the robot apparatus is equal to or greater than the predetermined reference minimum distance;

d25132) if it is determined that the movement distance of the robot apparatus is equal to or greater than the predetermined reference minimum distance, setting a current coordinate by adding a X coordinate to a previous X coordinate, wherein the X coordinate is set according to the direction; and d25133) if it is determined that the movement distance of the robot apparatus is smaller than the predetermined reference minimum distance, keeping on the sound direction movement mode and finishing a detour operation.

39. The method as recited in claim 36, wherein the step d2516) includes the steps of:

d25161) determining whether a value of the current coordinate is greater than a value corresponding to a half the minimum coordinate;

d25162) if the value of the current coordinate is greater than the value corresponding to the minimum coordinate, setting the sound direction movement mode; and d25163) if the value of the current coordinate is not greater than the value corresponding to the minimum coordinate, keeping on the detour operation mode.

40. The method as recited in claim 39, wherein the step d2517) includes the steps of:

d25171) determining whether the value of the current coordinate is smaller than a value corresponding to a half the maximum coordinate;

d25172) if it is determined that the value of the current coordinate is smaller than the value corresponding to the half the maximum coordinate, setting the sound direction movement mode; and d25173) if it is determined that the value of the current coordinate is not smaller than the value corresponding to the half the maximum coordinate, keeping on the detour operation mode.

41. The method as recited in claim 28, wherein the step d145) includes the steps of:

d1451) determining whether a difference between the calculated movement direction of the robot's body and the target movement direction is smaller than a predetermined minimum-direction error value;

d1452) if the calculated difference is smaller than the minimum-direction error value, stopping a turning operation of the robot's body;

d1453) if the calculated difference is not smaller than the minimum-direction error value, determining whether a difference between a detected value of the robot's movement direction and a detected current value of the robot's movement direction is greater than the minimum-direction error value;

d1454) if the calculated difference is greater than the minimum-direction error value, repeating the step d146); and d1455) if the calculated difference is not greater than the minimum-direction error value, repeating the step d147).

42. The method as recited in claim 28, wherein the step d146) includes the steps of:

d1461) determining whether the forward/backward direction value is set to '0';

d1462) if the forward/backward direction value is set to '0', moving backward by the predetermined minimum distance; and d1463) if the forward/backward direction value is not set to '0', moving forward by the predetermined minimum distance and repeating the step d141).

43. The method as recited in claim 42, wherein the step d147) includes the steps of:

d1471) if the forward/backward direction value is '1', changing the forward/backward direction value to '0', and if the forward/backward direction value is '0', changing the forward/backward direction value to '1', thereby changing the current direction inversely;

d1472) determining whether the number of correction is greater than the reference number of correction;

d1473) if the number of correction is greater than the reference number of correction, re-setting the number of correction to '0'; and d1474) if the number of correction is not greater than the reference number of correction, repeating the step d146).

44. The method as recited in claim 20, wherein the step d15) includes the steps of:

d151) determining whether a moving distance from the initial creation is greaser than a predetermined minimum distance required for analysis of the plane structure;

d152) if the moving distance is greater than the minimum distance, analyzing a coverage distance;

d153) extracting segments corresponding to components of the movement direction;

d154) by adding angles between extracted segments and a next segment, analyzing a closed-loop when an added angle is substantially 360°;

d155) by analyzing whether a length of a long segment among the extracted segments is accorded with a directivity, if accorded, determining whether the plane structure is the closed-loop having the added angle of substantially 360°; and d156) in case of the closed-loop, finishing the step of analyzing the plane structure.

45. The method as recited in claim 19, wherein the step b3) includes the steps of:

b31) if a predetermined time is passed after an operation command for indicating a guard operation mode is transmitted, performing a guard operation mode;

b32) detecting a first front distance between a current position of the robot apparatus and an object disposed at a front side, a first left-side distance between the current position of the robot apparatus and an object disposed at a left side, and a first right-side distance between the current position of the robot apparatus and an object disposed at a right side;

b33) storing the first front distance, the first left-side distance and the first right-side distance;

b34) detecting a second front distance, a second left-side distance and a second right-side distance;

b35) comparing the first front distance, the first left-side distance and the right-side distance with the second front distance, the second left-side distance and the right-side distance, respectively, performing a first alarm depending on whether the robot apparatus is moved or not; and b36) under the first alarm, analyzing an inputted voice data for identity, and performing an alarm depending on whether an analyzed voice data is a previously registered voice data.

46. The method as recited in claim 45, wherein the step b35) includes the steps of:

b351) checking whether the position of the robot apparatus is changed or not;

b352) if it is checked the position of the robot apparatus is changed, performing the first alarm;

b353) if it is checked at the step b352) that the position of the robot apparatus is not changed, checking whether the human body is detected;

b354) if it is checked at the b353) that the human body is not detected, repeating the step b34); and b355) if it is checked at the step b353) that the human body is detected, repeating the step b352).

47. The method as recited in claim 46, wherein the step b36) includes the steps of:

b361) under the first alarm, analyzing the inputted voice data for identity;

b362) checking whether or not the analyzed voice data is a previous registered voice data;

b363) if it is checked that the inputted voice data is not the previously registered voice data, operating the alarm; and b364) if it is checked that the inputted voice data is the previously registered voice data, performing the step b32).

48. The method as recited in claim 18, wherein the step b) includes the steps of:

b1) detecting a sound signal generated from an exterior, and checking whether or not the generated sound signal is detected;

b2) if the generated sound signal is detected, moving toward a sound source generating the sound signal;

b3) if the generated sound signal is not detected, checking whether or not the human body is detected;

b4) if the human body is detected, sensing a direction of the human body and moving to the direction of the human body;

b5) if the human body is not detected, checking a scan number performed to sense the human body and checking the sense of the human body in the range of 360° depending on whether the scan number is greater than a predetermined reference scan number;

b6) if the human body is detected at the step b5), repeating the step b4); and b7) if the human body is not detected at the step b5), moving to a wall or a corner after a predetermined time from the sense of the human body, and then maintaining a standby status.

49. The method as recited in claim 48, wherein the step b4) includes the steps of:

b41) checking whether the sensed direction of the human body is more than two;

b42) if it is checked that the sensed direction of the human body is more than two, moving to a human body sensed in a direction closest to a direction of previous movement or track; and b43) if it is checked that the sensed direction of the human body is one, moving to the sensed direction.

50. The method as recited in claim 48, wherein the step b5) includes the steps of:

b51) checking a scan number performed to sense a human body and determining whether or not a checked scan number is greater than the predetermined reference scan number;

b52) if it is determined that the checked scan number is greater than the predetermined scan number, checking whether a human body is detected in the range of 360°;

b53) if thie human body is detected at the step b52), repeating the step b4);

b54) if the human body is detected at the step b52), repeating the step b7); and b55) if it is determined that the checked scan number is not greater than the predetermined reference scan number, repeating the step b3).

51. The method as recited in claim 50, wherein the step b7) includes the steps of:

b71) determining whether or not the predetermined time is passed after detection of the human body;

b72) if it is determined that the predetermined time is passed, moving to a wall or a corner and then maintaining a standby status; and b73) if it is determined that the predetermined time is not passed, repeating the step b1).

52. The method as recited in claim 18, if added angles between segments obtained through a plane structure analysis is substantially less than 360°, turning as much as 90° and then moving forward until a front distance becomes a predetermined reference near distance and initializing an entire system.

53. The method as recited in claim 18, wherein a portion to which a sensor for detecting a human body is mounted is rotated, to thereby detect and trace a motionless human body.

54. The method as recited in claim 18, wherein, if a front distance, a left-side distance and a right-side distance are a near distance, and a sum of the left-side distance and the right-side distance is greater than a minimum space required to rotate the robot's body, the robot is turned left as much as 90°, and wherein, if the front distance, the left-side distance and the right-side distance are a near distance and a sum of the left-side distance and the right-side distance is not greater than a minimum space required to rotate the robot apparatus, a backward movement operation is set.

55. The method as recited in claim 54, wherein the front distance and the left-side distance are the near distance and the right-side distance is a far distance, turning a right as much as 90° and then setting a forward movement operation.

56. The method as recited in claim 55, wherein, if the front distance is a near distance, the left-side distance is a far distance and the right-side distance is a near distance, turning left as much as 90° and setting a forward movement operation.

57. The method as recited in claim 56, wherein, if the front distance is a near distance, the left-side distance is a far distance and the right-side is a far distance, and if a previous operation is a turning left as much as 90°, turning left as much as 90° and setting a forward movement operation, wherein, if the front distance, the left-side distance and the right-side distance are far distances, and if a previous operation is a turning right as much as 90° and a moving forward, turning left as much as 90° and then setting a forward movement operation, and wherein, if a previous front distance, a previous left-side distance and a previous right-side distance are far distances, if a previous operation is not a turning right as much as 90° and not a moving forward, turning right as much as 90° and then setting a forward movement operation.

58. The method as recited in claim 57, wherein, if a current front distance is a far distance, a left-side distance is a near distance and a right-side distance is a near distance, and if a previous operation is a backward movement or a turning left as much as 90°, and if a sum of the current left-side distance and the current right-side distance is greater than a minimum space required to rotate the robot apparatus, setting a turning left as much as 90°, wherein, if the current front distance is a far distance, the left-side distance is a near distance and a right-side distance is a near distance, and if a previous operation is not a turning left as much as 90° and the previous operation is a backward movement operation, setting a backward movement operation, and wherein, if the current front distance is a far distance, a left-side distance is a near distance and a right-side distance is a near distance, and if a previous operation is not a backward movement operation, setting a forward movement operation.

59. The method as recited in claim 58, wherein, if the current front distance is a far distance, a left-side distance is a near distance and a right-side distance is a far distance, and if a previous operation is a backward movement operation, setting a left as much as 90°, and wherein, if the current front distance is a far distance, the current left distance is a near distance and the current right distance is a far distance, and if a previous operation is not a backward movement operation, turning right as much as 90° and then setting a forward movement operation.

60. The method as recited in claim 59, wherein, if the current front distance and the current left-side distance are far distances and a right-side distance is a near distance, and if a previous operation is a backward movement operation, setting a turning left as much as 90°, wherein, if the robot apparatus is able to rotate in the current right-side distance and a previous front distance and a previous left-side distance are far distances and the right-side distance is a near distance, and if a previous operation is a forward movement operation, turning left as much as an angle corresponding to an inverse tangent of a value obtained by dividing a movement distance by a difference between a predetermined minimum unit angle or a current right distance and a previous right distance, and then setting a forward movement operation, and wherein, if the current right-side distance of the robot apparatus is out of a distance required for the robot apparatus to be rotated, and if a previous front distance is farther than the distance required for the robot apparatus to be rotated, if the left-side distance is a far distance, the right-side distance is a near distance and a previous operation is a forward movement operation, turning right as much as an angle corresponding to an inverse tangent of a value obtained by dividing a movement distance by a difference between a predetermined minimum unit angle or a current right distance and a previous right distance, and then setting a forward movement operation.

61. The method as recited in claim 60, wherein, if the current front distance, the current left-side distance and the right-side distance are far distances and if a previous operation is a turning left as much as 90° for four successive times, setting a forward movement operation, wherein, if the current front distance, the current left-side distance and the right-side distance are far distances, and if the previous operation is a turning right for four successive times, setting a forward movement operation, wherein, if the previous front distance, the previous left-side distance and the previous right-side distance are far distances, and if the previous operation is a forward movement operation, setting a forward movement operation, wherein, if the previous front distance, the previous left-side distance and the previous right-side distance are far distances, and if the previous movement is not a forward movement operation, and if the previous movement is a backward movement or a turning left as much as 90°, setting a turning left as much as 90°, and wherein, if the previous front distance, the previous left-side distance and the previous right-side distance are far distances, and if the previous operation is not a forward movement, a backward movement or a turning left as much as 90°, setting a turning right as much as 90° and then setting a forward movement operation.

62. The method as recited in claim 18, wherein, if the current front distance, the left-side distance and the right-side distance are near distances, and if a sum of the left-side distance and the right-side distance is greater than a minimum space required for the robot apparatus to be rotated, setting a turning right as much as 90°, and wherein, if the current front distance, the current left-side distance, and the current right-side distance are near distances, and if the sum of the left-side distance and the right-side distance is not greater than the minimum space, setting a backward movement operation.

63. The method as recited in claim 62, wherein, if the current front distance and the left-side distance are near distance and the current right-side distance is a far distance, setting a turning right as much as 90° and then setting a forward movement operation.

64. The method as recited in claim 63, wherein, if the current front distance, the current left-side distance and the right-side distance are near distance, setting a turning left as much as 90° and then setting a forward movement operation.

65. The method as recited in claim 64, wherein, if the current front distance is a near distance, the current left-side distance is a far distance and the current right-side distance is a far distance, and if a previous operation is a turning right as much as 90°, setting a turning right as much as 90° and then setting a forward movement operation, and wherein, if the current front distance is a near distance, the current left-side distance is a far distance and the current right-side distance is a far distance, and if a previous operation is not a turning right as much as 90°, or if the previous front distance, the left-side distance and the right-side distance are far distances and if the previous operation is not a forward movement operation, turning left as much as 90° and setting a forward movement operation.

66. The method as recited in claim 65, wherein, if the current front distance is a far distance, the current left-side distance is a near distance and the right-side distance is a near distance, and if a previous operation is a backward movement operation or a turning right as much as 90°, and if a sum of the current left-side distance and the right-side distance is greater than a minimum space required for the robot apparatus to be rotated, setting a turning right as much as 90°, wherein, if the current front distance is a far distance, the current left-side distance is a near distance and the right-side distance is a near distance, and if the previous operation is a backward movement operation, setting a backward movement operation, and wherein, if the current front distance is a far distance, the left-side distance is a near distance and the right-side distance is a near distance, and if the previous operation is not a backward movement operation, setting a forward movement operation.

67. The method as recited in claim 66, wherein, if the current front distance is a far distance, the left-side distance is a near distance and the right-side distance is a far distance, and if the previous operation is a backward movement operation, setting a turning right as much as 90°, wherein, if the current front distance is a far distance, the left-side distance is a near distance and the right-side distance is a far distance, and if the robot apparatus is unable to rotate in the current left-side distance and a previous front distance is a far distance and a left-side distance is a near distance, and the right-side distance is a far distance, and if the previous operation is a forward movement operation, turning right as much as an angle corresponding to an inverse tangent of a value obtained by dividing a movement distance by a difference between a predetermined minimum unit angle or a current right distance and a previous right distance, and then setting a forward movement operation, wherein, if the current right-side distance of the robot apparatus is out of a distance required for the robot apparatus to be rotated, and if a previous front distance is a far distance, a previous left-side distance is a near distance and the previous right-side distance is a far distance and a previous operation is a forward movement operation, turning left as much as an angle corresponding to an inverse tangent of a value obtained by dividing a movement distance by a difference between a predetermined minimum unit angle or a current right distance and a previous right distance, and then setting a forward movement operation, and wherein, if the current right-side distance of the robot apparatus is out of a distance required for the robot apparatus to be rotated, and if a previous front distance is a far distance, a previous left-side distance is a near distance and the previous right-side distance is a far distance and a previous operation is not a forward movement operation, setting a forward movement operation.

68. The method as recited in claim 67, wherein, if the current front distance and the left-side distance are far distances, and the right-side distance is a near distance, and if a previous operation is a backward movement operation, setting a turning right as much as 90°, and wherein, if the current front distance and the left-side distance are far distances and the right-side distance is a near distance, and if the previous operation is not a backward movement operation, turning left as much as 90° and then setting a forward movement operation.

69. The method as recited in claim 68, wherein, if the current front distance is a near distance, the left-side distance and the right-side distance are far distances, and if the previous operation is a turning right as much as 90° in four successive times, setting a forward movement operation, wherein, if the current front distance, the left-side distance and the right-side distance are far distances, and if the previous operation is a turning left as much as 90° in four successive times, setting a forward movement operation, wherein, if the previous front distance, the previous left-side distance and the previous right-side distance are far distances, and if the previous operation is a forward movement operation, setting a forward movement operation, wherein, if the previous front distance, the left-side distance and the previous right-side distance are far distances, and if the previous operation is a backward movement operation or a turning right as much as 90°, setting a turning right as much as 90°, and wherein, if the previous front distance, the previous left-side distance and the previous right-side distance are far distances, and if the previous operation is not a backward movement operation or a turning right, turning left as much as 90° and then setting a forward movement operation.

* * * * *

UNITED STATES PATENT AND TRADEMARK OFFICE
CERTIFICATE OF CORRECTION

PATENT NO. : 6,308,114 B1
DATED : October 23, 2001
INVENTOR(S) : I. Kim

It is certified that error appears in the above-identified patent and that said Letters Patent is hereby corrected as shown below:

<u>Title page,</u>
Item [57], ABSTRACT,
Line 6, "unit (114)" should be -- units --.
Line 7, delete "(118)".
Line 8, delete "(114)".
Line 9, delete "(125)".
Line 11, delete "(130)".

<u>Column 36,</u>
Line 63, "creation is greaser" should be -- operation is greater --.

<u>Column 38,</u>
Line 41, "thie" should be -- the --.

Signed and Sealed this

Fourth Day of June, 2002

*Attest:*

*Attesting Officer*

JAMES E. ROGAN
*Director of the United States Patent and Trademark Office*